Jan. 29, 1952   H. R. FISCHER ET AL   2,583,733
HYDRAULIC TOOL FOR PULLING CLINCH NUTS
Filed Jan. 23, 1948   17 Sheets-Sheet 1
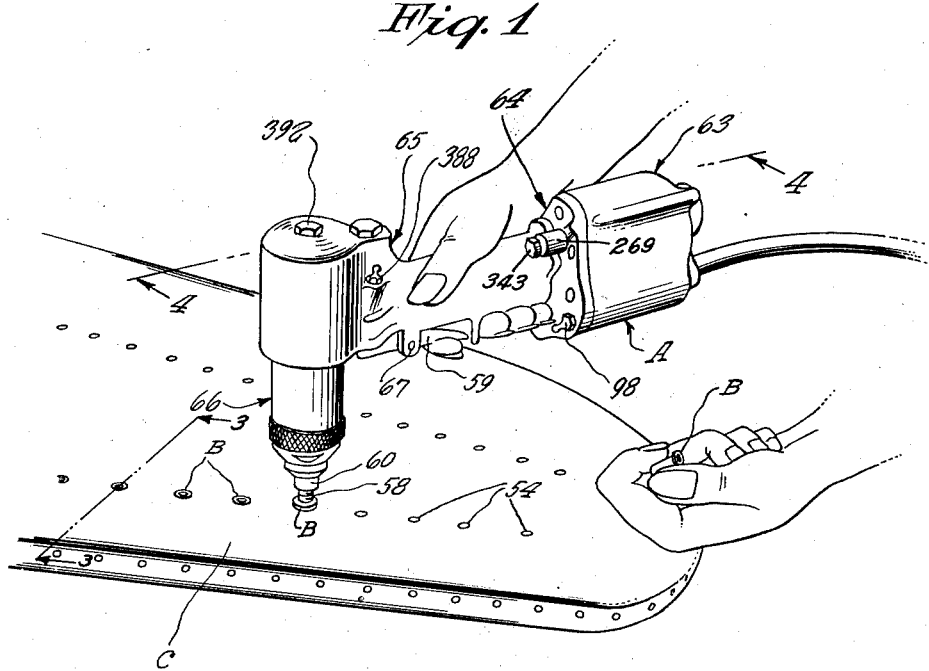
Fig. 1
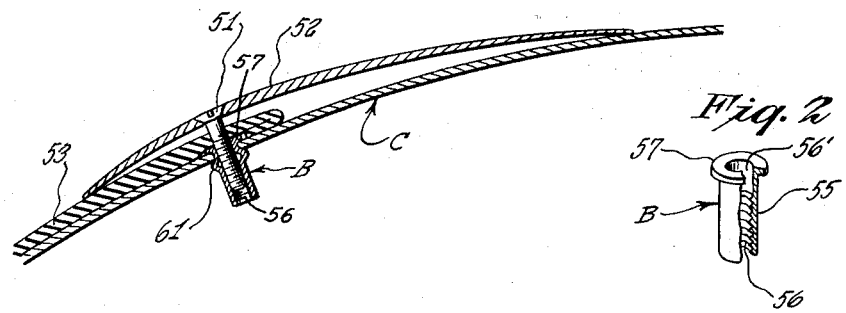
Fig. 3
Fig. 2
INVENTORS
HOWARD R. FISCHER
& JAMES A. ROBERTS
BY
Raymond G. Mullee
ATTORNEY

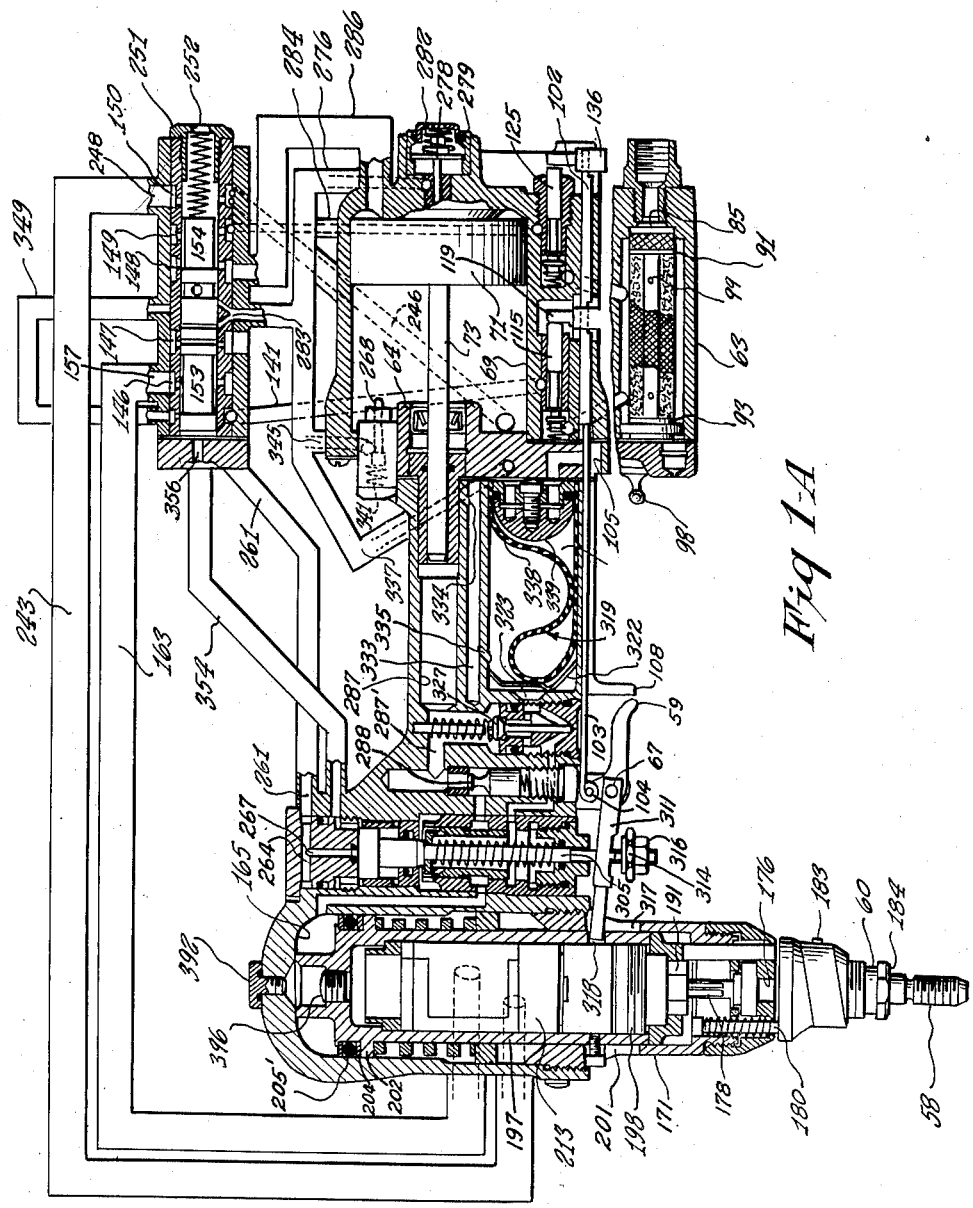
Fig 1-A

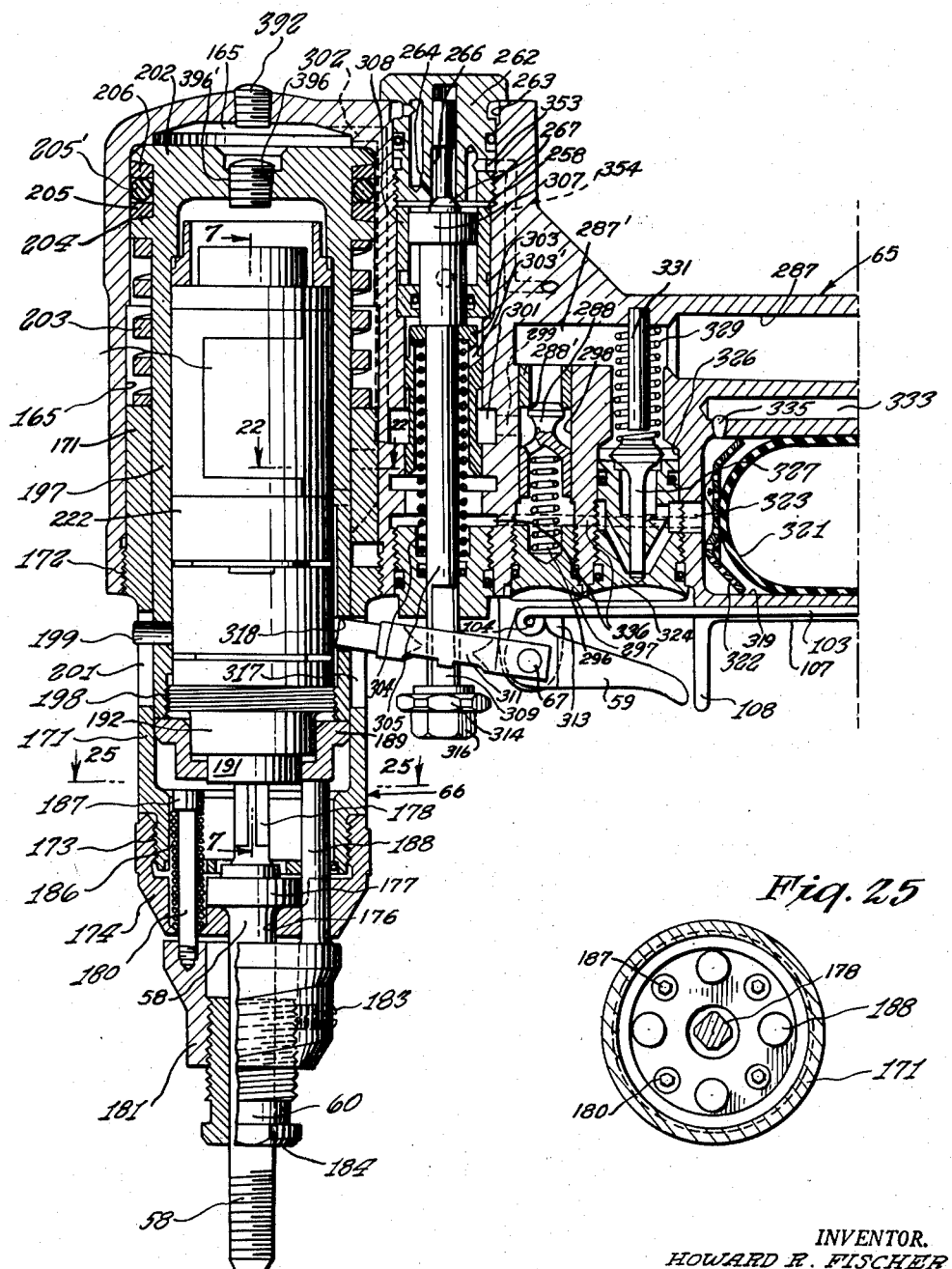

Jan. 29, 1952  H. R. FISCHER ET AL  2,583,733
HYDRAULIC TOOL FOR PULLING CLINCH NUTS
Filed Jan. 23, 1948  17 Sheets-Sheet 4

INVENTORS
HOWARD R. FISCHER
& JAMES A. ROBERTS
BY
Raymond G. Mullee
ATTORNEY

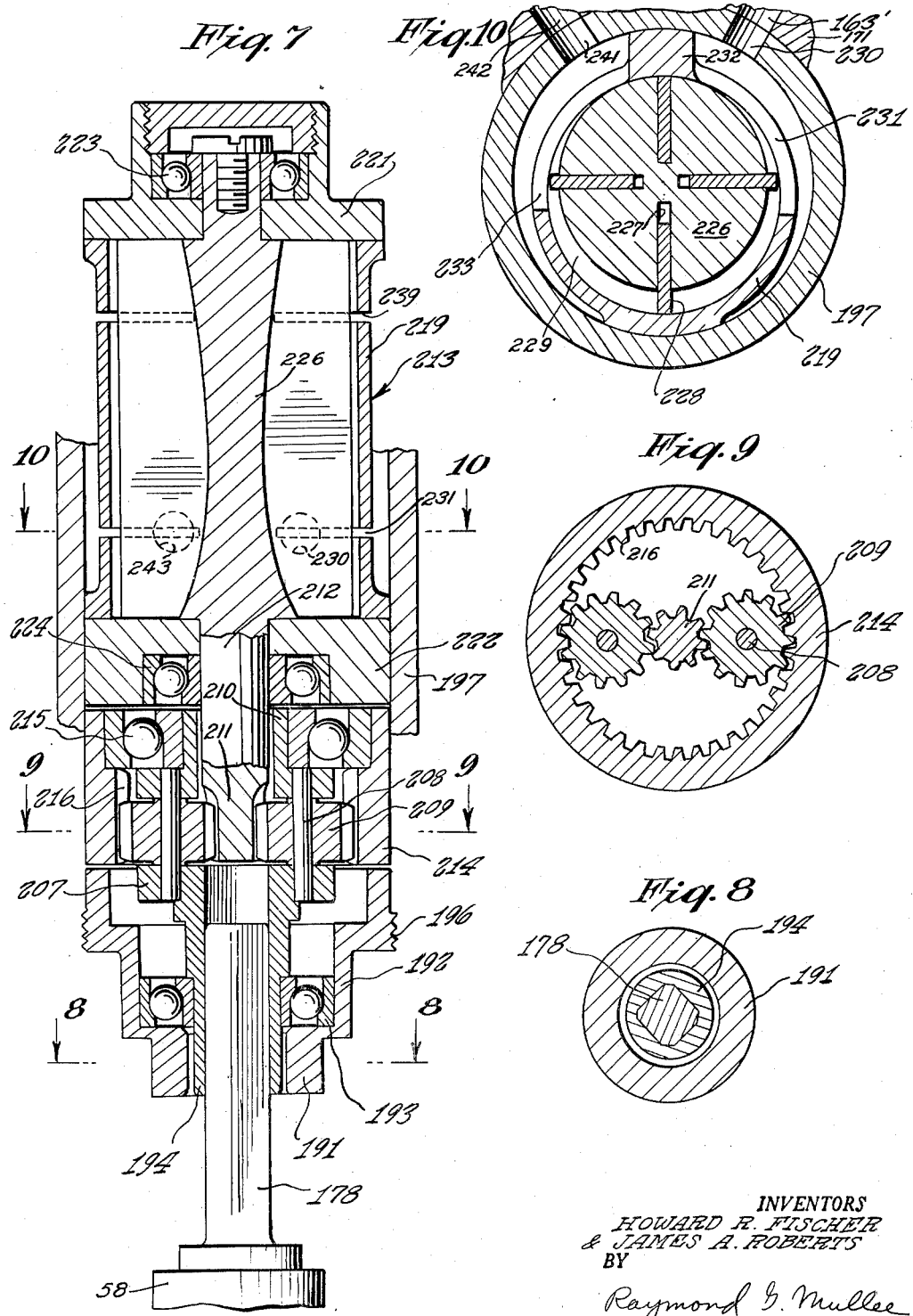

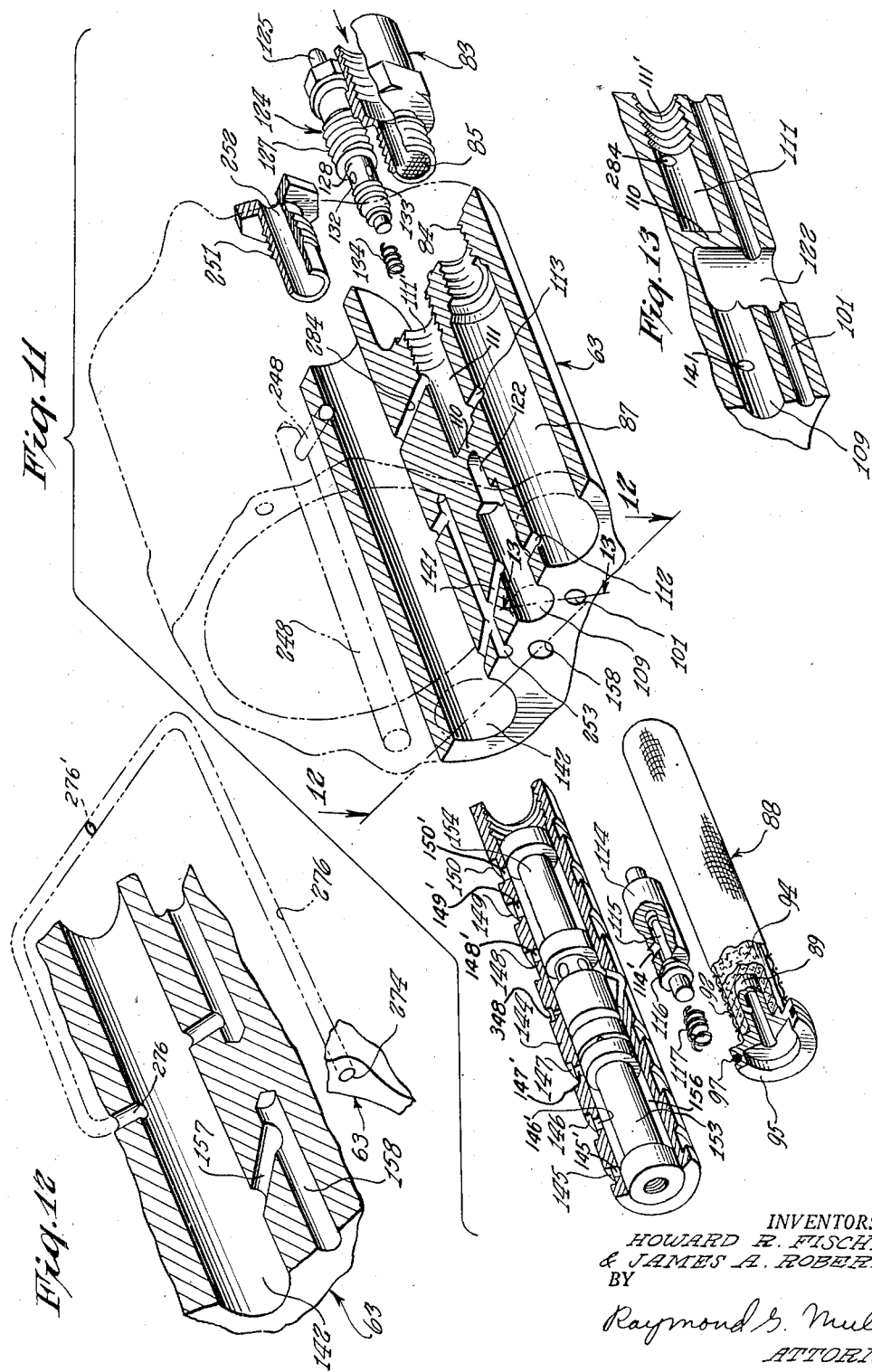

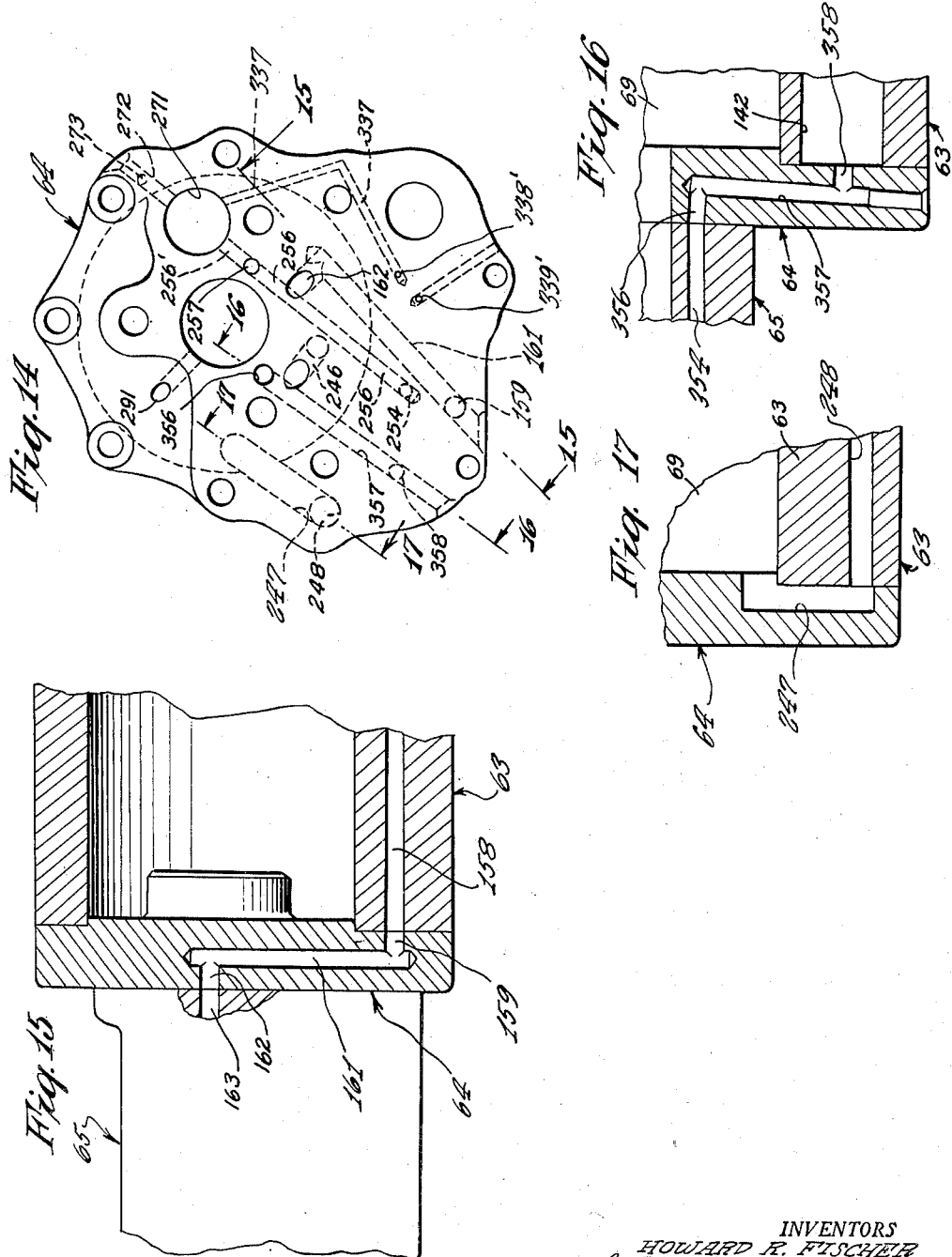

Jan. 29, 1952     H. R. FISCHER ET AL     2,583,733
HYDRAULIC TOOL FOR PULLING CLINCH NUTS
Filed Jan. 23, 1948     17 Sheets-Sheet 8
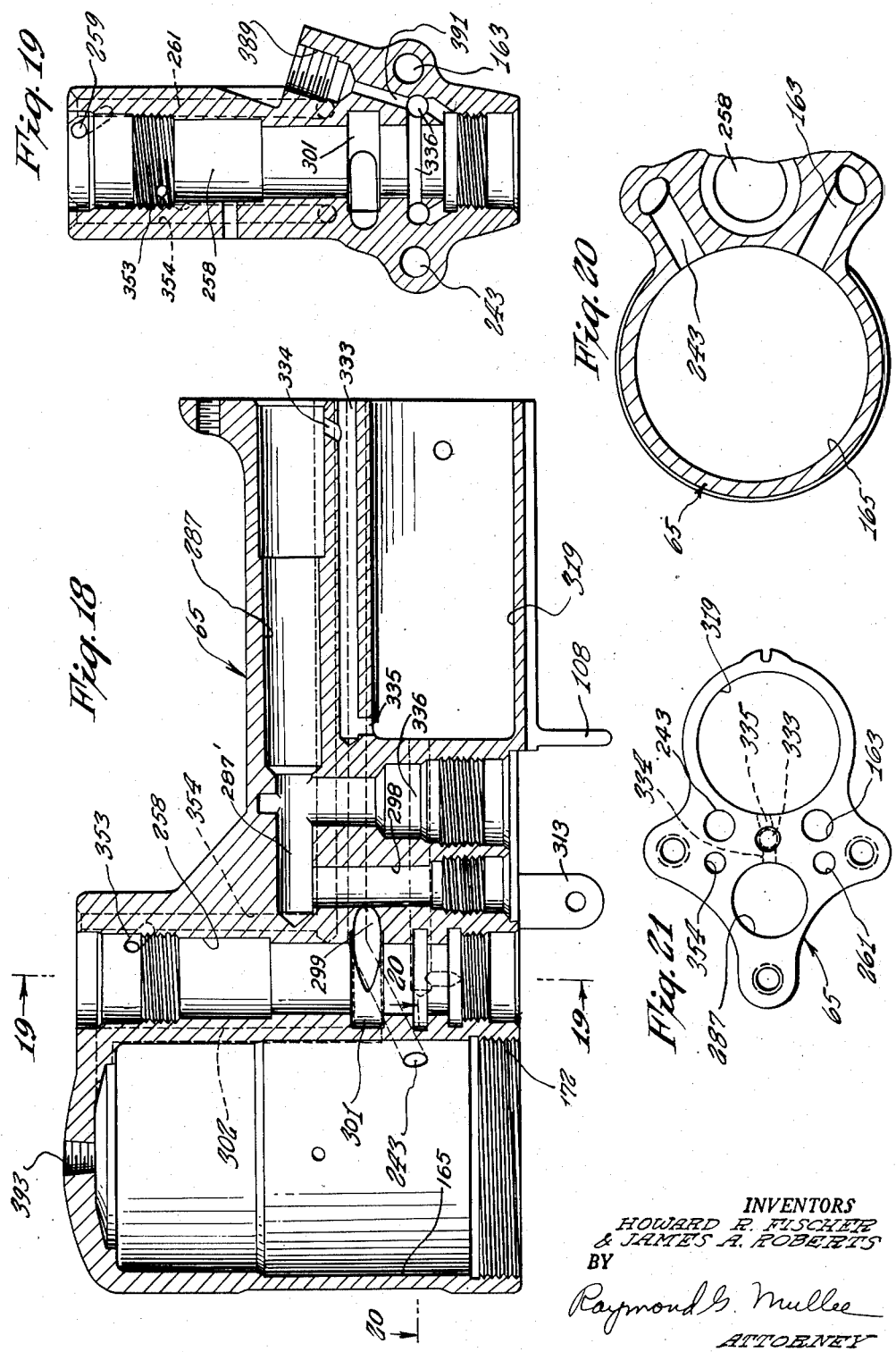
INVENTORS
HOWARD R. FISCHER
& JAMES A. ROBERTS
BY
Raymond G. Mullee
ATTORNEY Jan. 29, 1952     H. R. FISCHER ET AL     2,583,733
HYDRAULIC TOOL FOR PULLING CLINCH NUTS
Filed Jan. 23, 1948     17 Sheets-Sheet 9
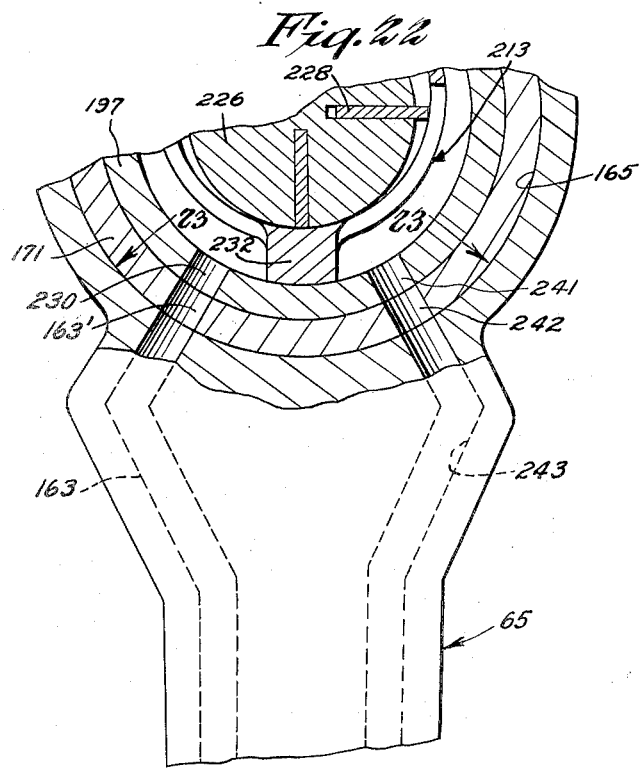
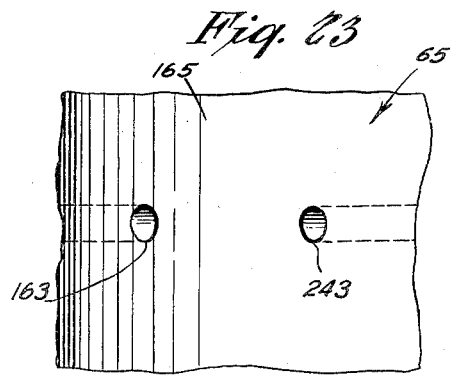
INVENTORS
HOWARD R. FISCHER
& JAMES A. ROBERTS
BY
Raymond G. Mullee
ATTORNEY

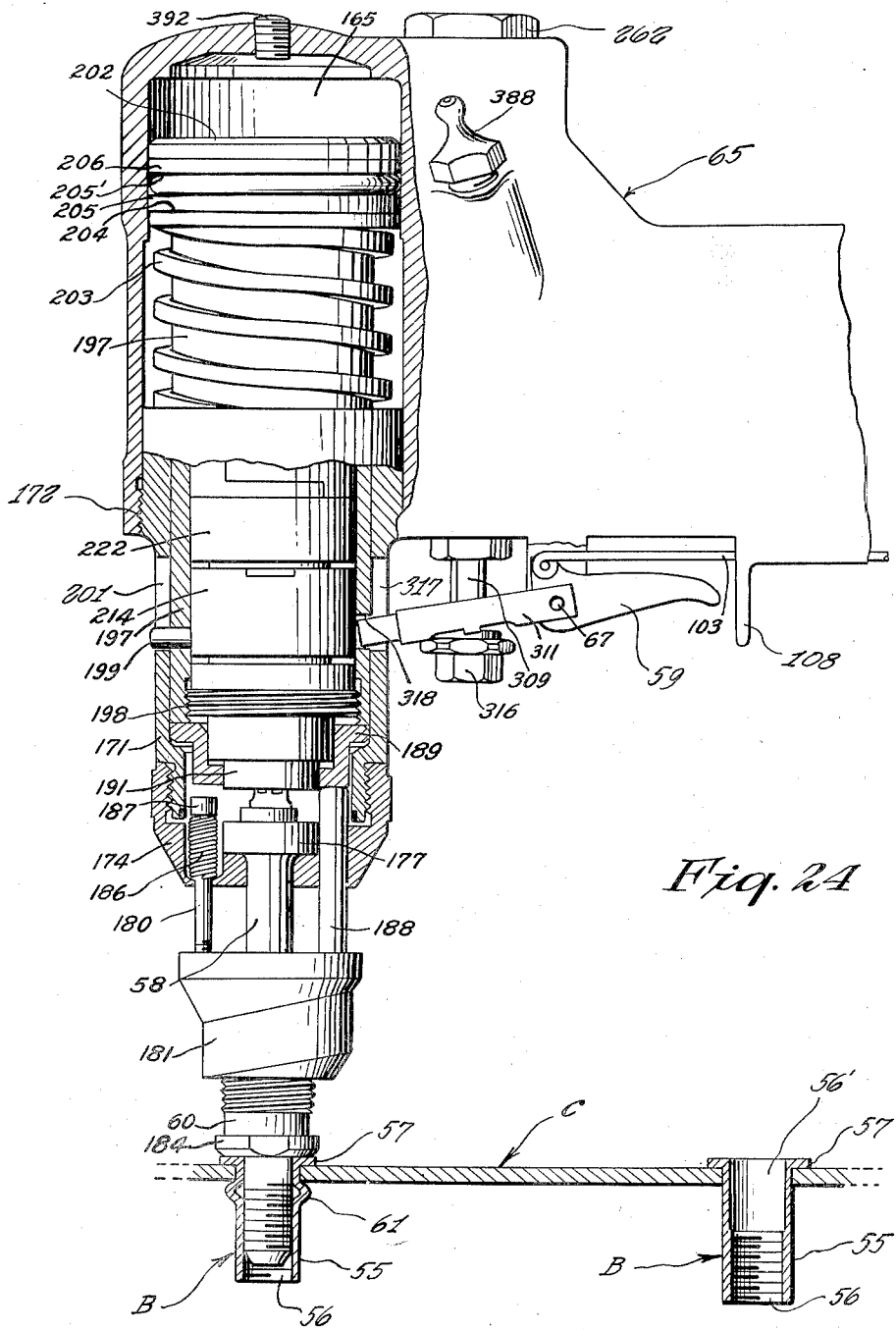

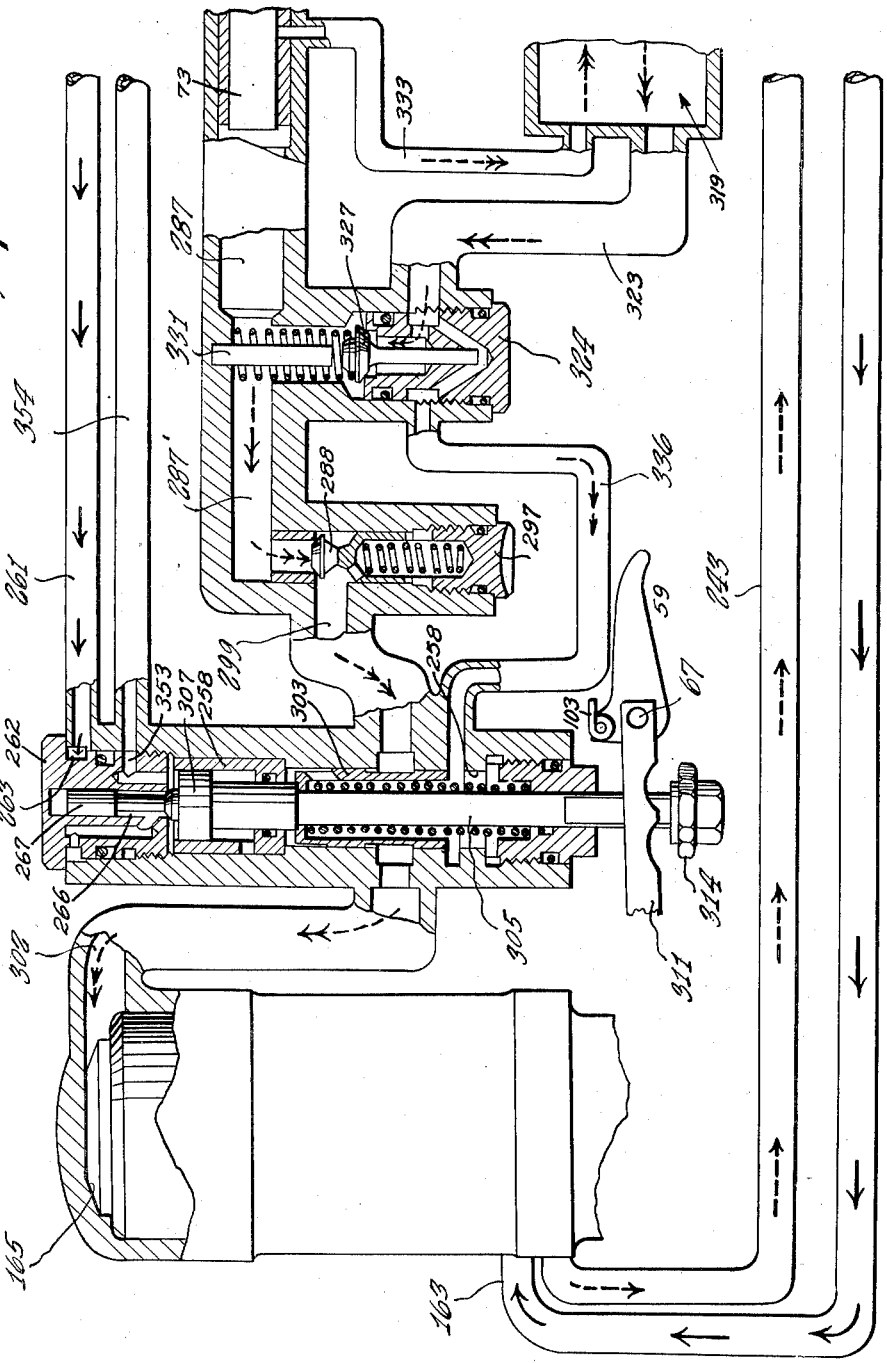

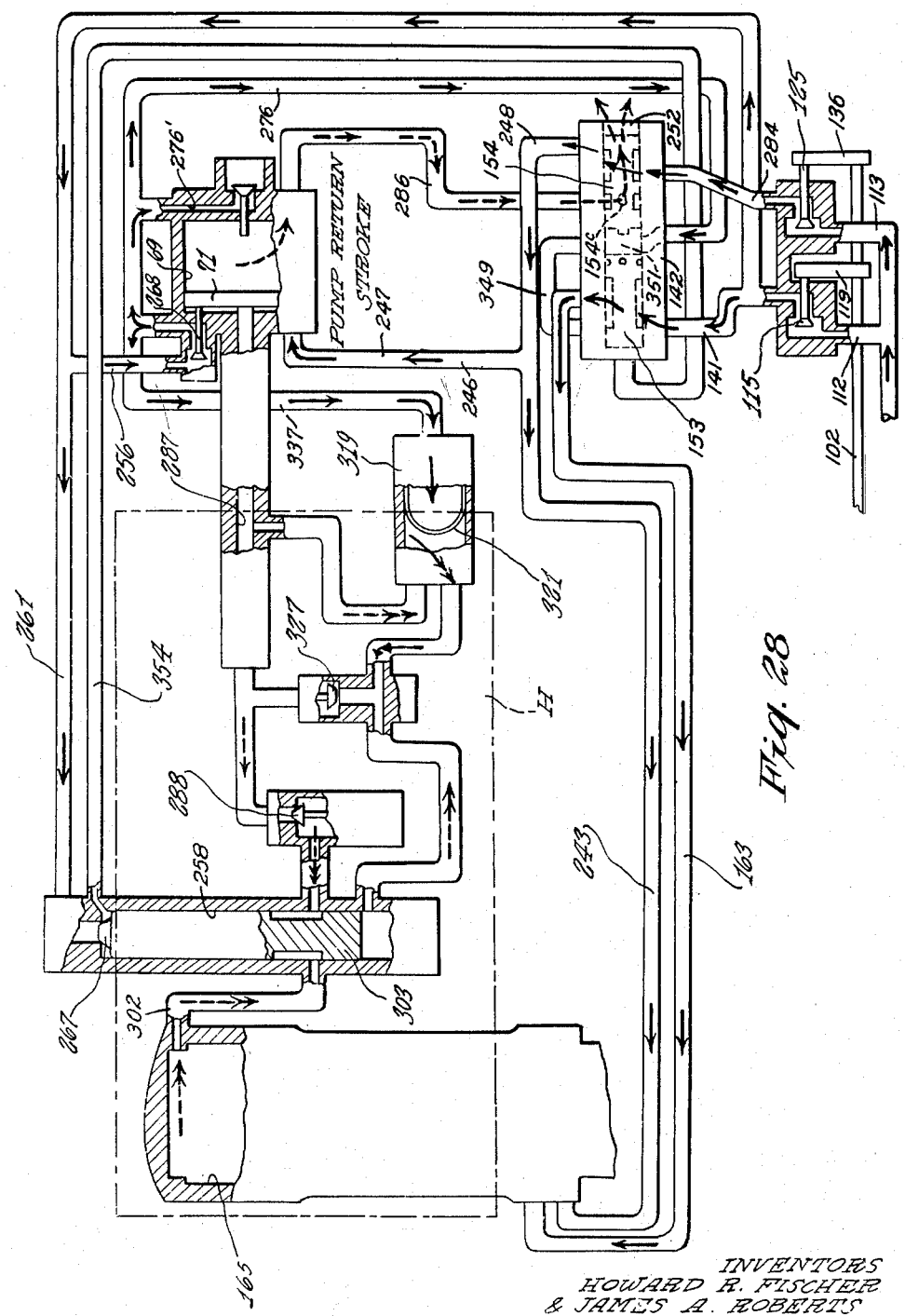

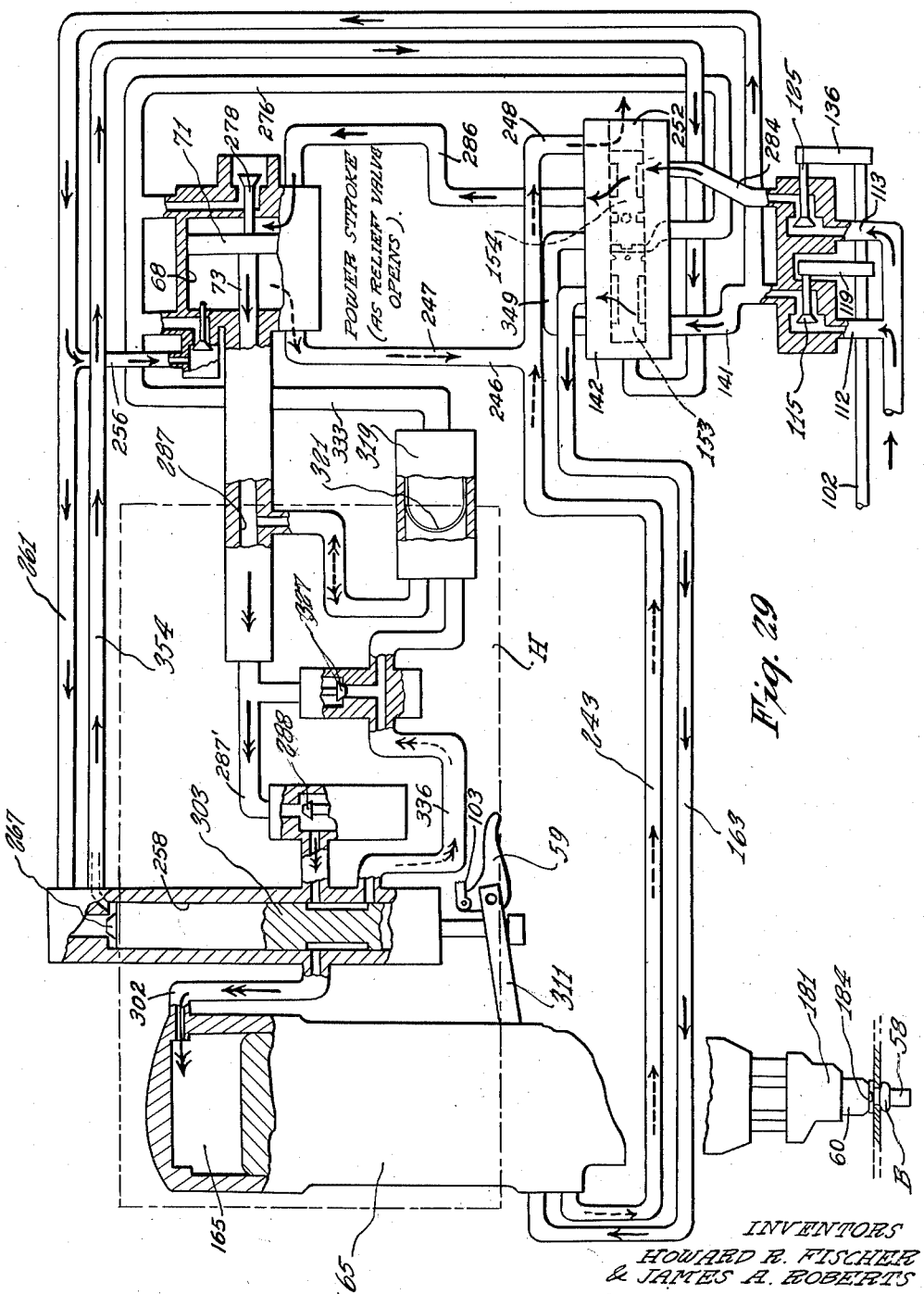

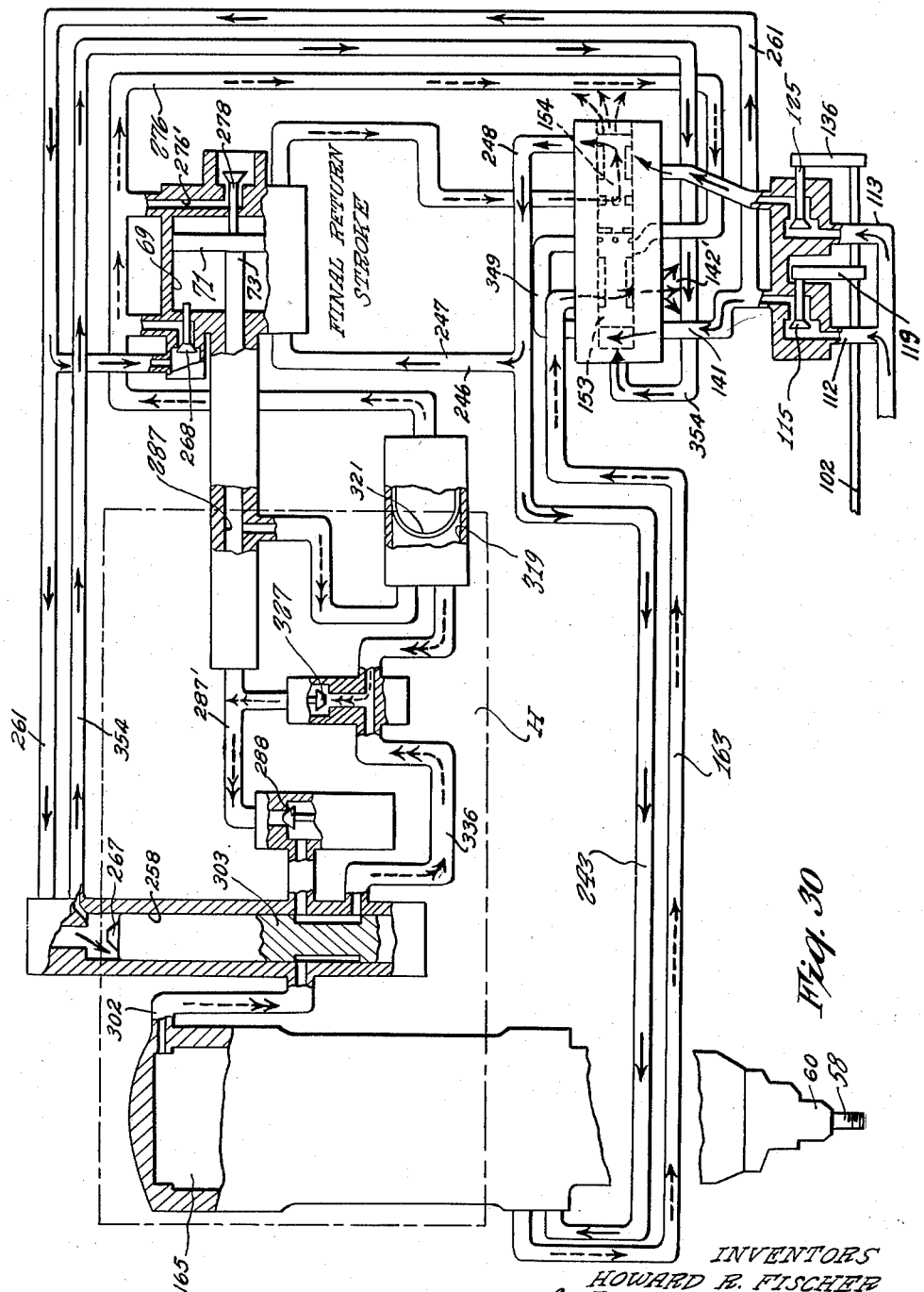

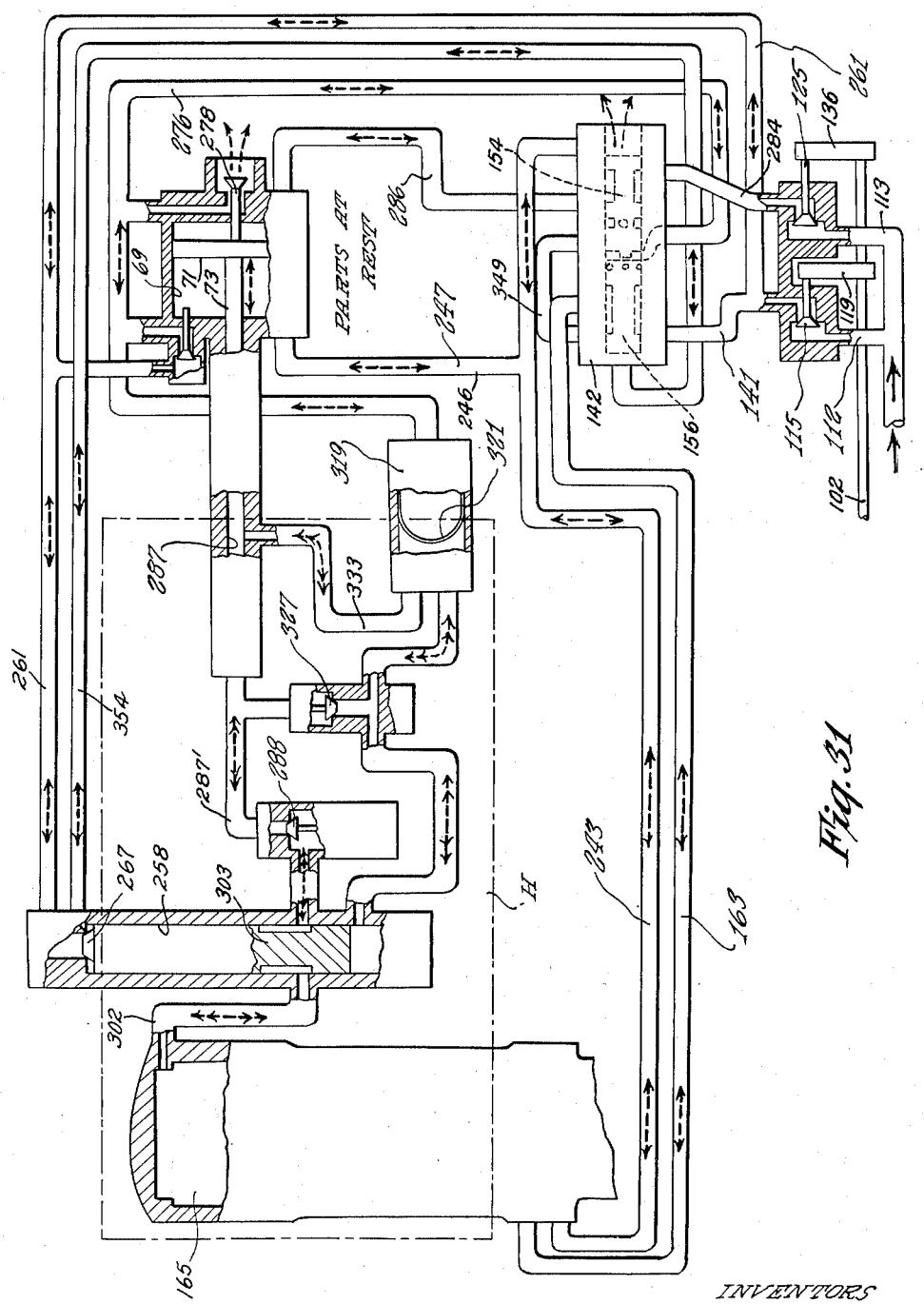

Patented Jan. 29, 1952

2,583,733

UNITED STATES PATENT OFFICE 2,583,733

HYDRAULIC TOOL FOR PULLING CLINCH NUTS

Howard R. Fischer and James A. Roberts, Detroit, Mich., assignors to Chicago Pneumatic Tool Company, New York, N. Y., a corporation of New Jersey Application January 23, 1948, Serial No. 3,926

14 Claims. (Cl. 218—19)

This invention relates to a power operated pull gun for setting clinch nuts or flanged screw sockets, blind rivets and the like which requires both rotary and axial motions in successive steps in order to first place the gun in the clinch nut or rivet and then to upset or pull the clinch nut to secure it to the work pieces.

Clinch nuts or flanged screw sockets are tubular, internally threaded elements, and counterbored from one third to one half the length of the clinch nut depending on the thickness of the work sheets in which the clinch nuts are driven. To anchor the screw mandrel within the clinch nut prior to the upsetting operation, the mandrel is threaded into the clinch nut. These clinch nuts or flanged screw sockets have application upon airplanes or on other sheet metal constructions wherein access cannot be had to the inner end of the fastening element to effect its connection upon the sheet metal. They have an internally threaded shank portion and a flanged outer end. The counterboring extends from the flanged outer end. The shank portion is inserted through a drilled hole in the work pieces and is expanded in a bulbous manner on the inner wall of the work pieces while the flanged head is brought into and retained in flush engagement with the outer wall of the work pieces to form a bulbous formation engaging with the inaccessible under face or inner wall of the work pieces.

It is an object of the present invention to provide a power operated clinch nut pull gun which is of light weight, easy to handle and which can be held in one hand while the clinch nut is threaded upon its mandrel prior to its insertion in the drilled hole and wherein the operation of threading the clinch nut upon the mandrel can be effected by a part pull upon a trigger and wherein upon the last part of the pull or continued pull of the same trigger, the mandrel will be pulled upon effecting a pressure of the gun nose piece upon the flange of the clinch nut or screw socket and wherein, upon the completion of the upsetting operation, the work parts of the gun will be returned automatically to their original positions.

It is another object of the present invention to provide a pull gun for clinch nuts which includes an air-operated oil pump for effecting the upsetting operation of the clinch nut at high pressures and hydraulic mechanism including an air cushioned diaphragm and substantially constant pressure reservoir for maintaining the oil therein at all times under pressure so that regardless at which angular position the pull gun is used, the oil passages will be filled and wherein the air supply utilized for operating the oil pump is also provided for maintaining the pressure upon the oil within the oil reservoir and upon the opposite side of the diaphragm from the oil.

It is another object of the invention to provide a pull gun for setting clinch nuts including a rotary air motor and an air-operated oil pump for a hydraulic mechanism wherein air is utilized for the operation of the screw mandrel and oil pump and of valves effecting automatically the reversal of air flow to the air motor to automatically reverse its rotation to release the screw mandrel from the clinch nut and to operate the valve for effecting the power and return strokes of the air booster pump for the hydraulic mechanism, but where oil under high pressure is used for the upsetting of the clinch nut and wherein the hydraulic relief valve serves to release the air trapped under pressure for effecting the operation of the rotary air motor reverse valve.

Other objects of the present invention are to provide a combined hydraulic and air pull gun for setting clinch nuts which is of simple construction, easy to assemble and disassemble for repair, of compact and sturdy design, trigger controlled and efficient in operation.

For other objects and for a better understanding of the invention, reference may be had to the following detailed description taken in connection with the accompanying drawing, in which Fig. 1 is a perspective view of the outer end of an airfoil surface and of the power operated clinch nut pull gun embodying the features of the present invention, the gun being extended into the clinch nut in position to set the clinch nut.

Fig. 1–A is a longitudinal, generally central, view in section showing the mechanical operating parts and the general construction of the gun non-diagrammatically, the fluid passages being more or less diagrammatically shown, and the rearwardly positioned distributing valve being shown above the gun castings and the forwardly positioned air cleaning chamber being shown below the castings.

Fig. 2 is a perspective view of a clinch nut or flanged screw socket with a portion broken away to show the internal threads thereof together with the counterbore in the flanged end and with the clinch nut being in the form in which it is inserted into a previously prepared hole of an airfoil surface for attachment therewith.

Fig. 3 is an enlarged sectional view taken through an airfoil surface in which a clinch nut or flanged screw socket has been fixed, to which parts, such as a de-icing rubber, if disposed on the airfoil surface, are attached by screws entering the set clinch nuts, the view being taken generally on line 3—3 of Fig. 1.

Figs. 4A and 4B are enlarged longitudinal sectional views of the work engaging portions or mandrel end of the pull gun taken generally on line 4—4 of Fig. 1 and looking in the direction of the arrows thereof.

Fig. 5 is a bottom plan view of the air cylinder casting and of the closure plate therefor with portions broken away to show the air filtering chamber and the distributing valve parts.

Fig. 6 is a fragmentary and sectional detail view taken through the trip valve on the air cylinder closure plate.

Fig. 7 is a fragmentary and longitudinal sectional view taken through the rotary air motor used to drive the mandrel and the reduction gearing associated therewith, and generally on line 7—7 of Fig. 4A and looking in the direction of the arrows thereof.

Fig. 8 is a transverse sectional view of the drive connection of the threaded mandrel with the reduction gear unit, the view being taken on line 8—8 of Fig. 7 and looking in the direction of the arrows thereof.

Fig. 9 is a transverse sectional view of the reduction gear unit taken on line 9—9 of Fig. 7 and looking in the direction of the arrows thereof.

Fig. 10 is a transverse sectional view of the rotary air motor of the vane type taken generally on line 10—10 of Fig. 7 and looking in the direction of the arrows thereof.

Fig. 11 is an exploded view of a portion of the air cylinder casting with the valves and coupling parts extended out of their openings in the ends of the air cylinder casting and portions of the casting and the valves and coupling parts being broken away and shown in section to show their interiors.

Fig. 12 is a fragmentary perspective and sectional view of a portion of the air cylinder casting showing certain passages thereof, the view being taken generally on line 12—12 of Fig. 11 and looking down in the direction of the arrows thereof.

Fig. 13 is a fragmentary perspective view of a portion of the air cylinder casting broken away generally along line 13—13 of Fig. 11 and looking in the direction of the arrows thereof.

Fig. 14 is an outer face view, in elevation, of the closure plate extended over the open front end of the air cylinder casting.

Fig. 15 is a fragmentary sectional view of the closure plate and the air cylinder casting and taken generally on line 15—15 of Fig. 14 and looking in the direction of the arrows thereof, the associated parts of the closure plate being connected therewith.

Figs. 16 and 17 are fragmentary sectional views of the closure plate and the associated parts thereof and taken respectively on lines 16—16 and 17—17 of Fig. 14.

Fig. 18 is an enlarged longitudinal sectional view of the front casting housing the hydraulic mechanism and rotary air motor and taken generally on line 4—4 of Fig. 1.

Fig. 19 is a vertical sectional view taken through the front casting as shown in Fig. 18 and on line 19—19 thereof.

Fig. 20 is a transverse sectional view of the casting shown in Fig. 18 and taken through the hydraulic and air motor chamber and on line 20—20 thereof.

Fig. 21 is a rear end elevational view of the front casting shown in Fig. 18 and looking upon the face adapted to be attached to the closure plate shown in Fig. 14.

Fig. 22 is an enlarged fragmentary and sectional view of the front casting which contains the air motor and hydraulic work chamber and taken on line 22—22 of Fig. 4A and looking in the direction of the arrows thereof.

Fig. 23 is a vertical elevational view looking upon the work chamber face and upon the air ports or passages leading therefrom for effecting the operation of the air vane motor, the view being taken on line 23—23 of Fig. 22.

Fig. 24 is an enlarged fragmentary and sectional view similar to Fig. 4A with the work piston lowered in the front cylinder and the nose piece moved down upon the screw mandrel and a clinch nut upset to provide the bulbous formation thereon.

Fig. 25 (sheet 3) is a transverse sectional view taken through the mandrel support and on line 25—25 of Fig. 4A.

Figure 26B:
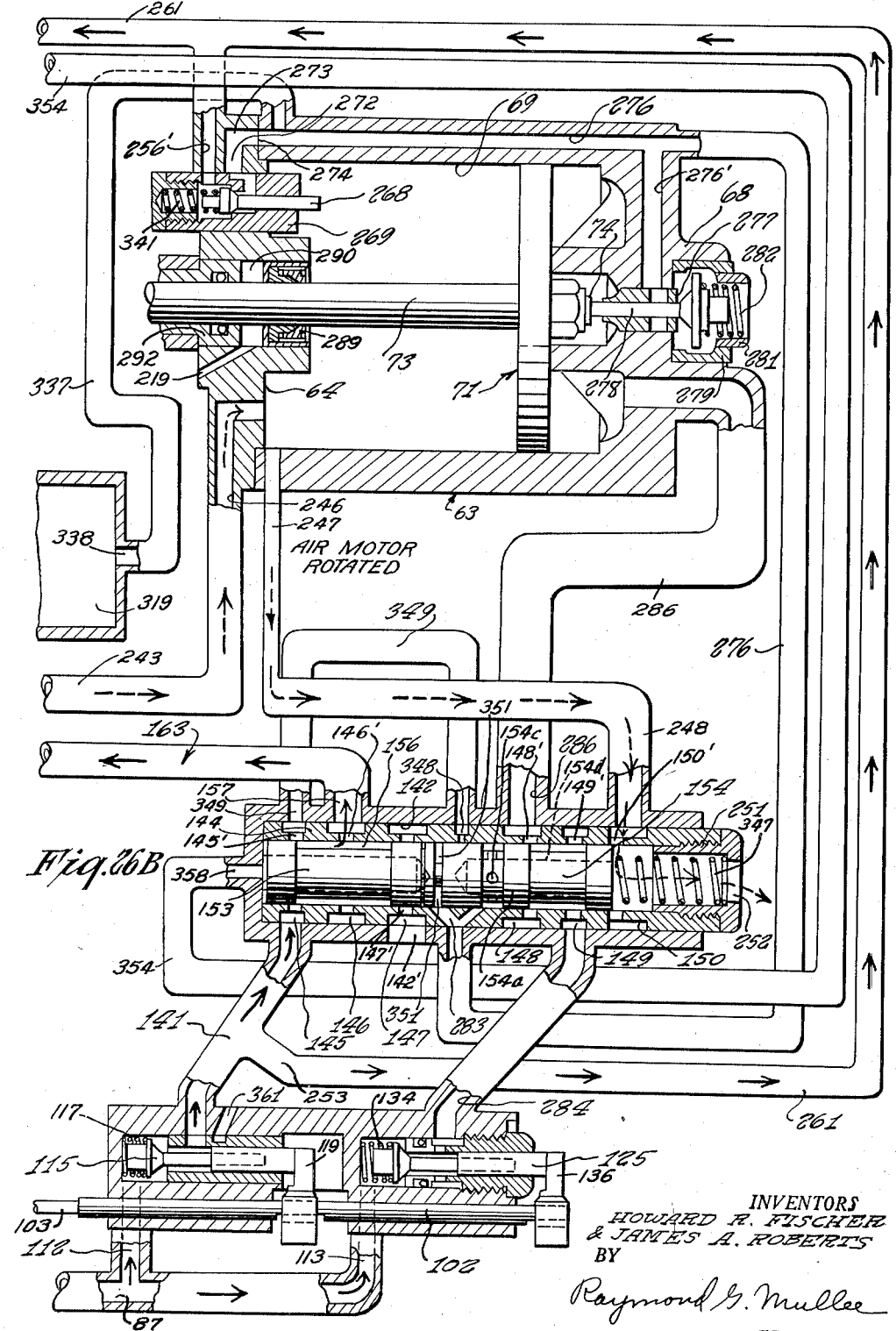

Figs. 26A and 26B are larger diagrammatic views of portions of the gun having air and oil passages with the flow of live air being indicated with single head arrows, the control trigger having been pulled part way to cause the rotation of the air motor and the screw mandrel for attaching the clinch nut with the mandrel, the flow of oil being shown with double head arrows.

Figure 27:
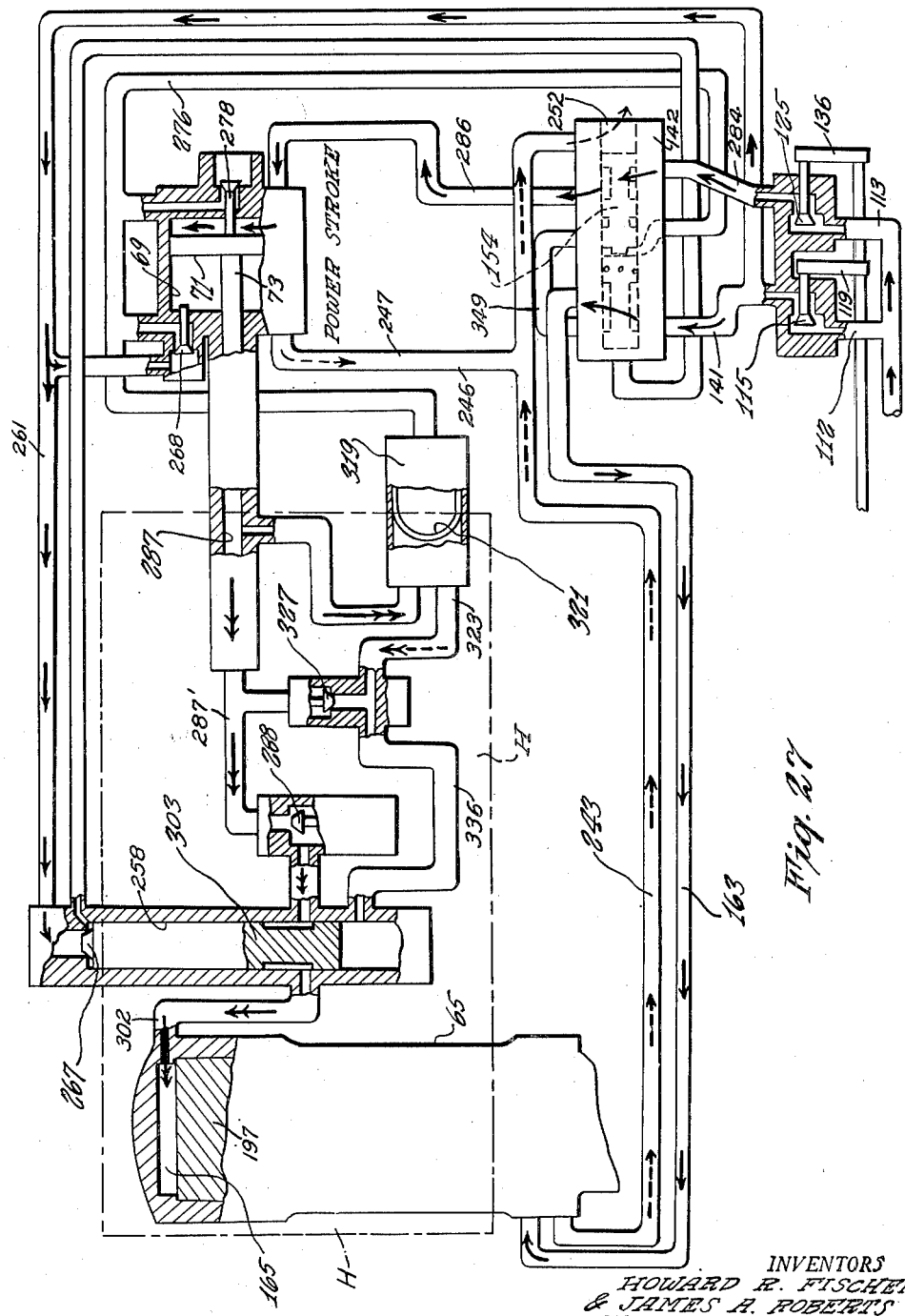

Fig. 27 is a diagrammatic view of the oil and air systems and of the parts containing the same with the passages being set to effect the power stroke upon the hydraulic piston in the front casting, the presence and flow of air in the air passages being indicated with single headed arrows, oil in its passages being indicated by double headed arrows.

Fig. 28 is a diagrammatic view showing the condition of the fluid in the passages when the piston in the air cylinder is about to make its return stroke, the oil in the work cylinder being retained to await the return of the high pressure oil pump plunger for again passing oil to the work cylinder to build up the pressure therein.

Fig. 29 is a diagrammatic view of air and oil systems when the bulb on the clinch nut has been completed and the reverse valve has been actuated, the arrows again indicating the direction of flow of the air and oil through the passages.

Fig. 30 is a diagrammatic view showing the air and oil systems and the condition of the oil and fluid therein and after the air motor reverse valve has been operated and air extended to the air motor in the reverse direction to screw the mandrel from the clinch nut.

Fig. 31 is a diagrammatic view of the oil and air systems when the pistons and valve parts of the same have been returned to their normal at rest positions.

Referring now particularly to Figs. 1, 2 and 3, A represents the power operated pull gun of the present invention and which is used for fixing a clinch nut or flanged screw socket B to an airfoil structure C. The clinch nuts B are used on this wing for the purpose of providing screw holes adapted to receive screws 51, Fig. 3, which are extended through a retaining plate 52 and an expandable de-icing rubber sleeve 53 which may be extended over the leading edge of the airfoil structure C. The clinch nut, when extended into a previously prepared hole 54 of the structure C, is of the form shown in Fig. 2 having a straight shank portion 55 which is internally threaded as shown at 56 and counterbored at 56'. At the upper end of the shank is a flange portion 57. The counterboring 56' extends from one-third to one-half the length of the shank portion 55, and from the flange portion 57, depending upon the thickness of the work sheets. With the pull gun A of the present invention, a threaded mandrel 58 thereof is extended into the clinch nut B from the flanged end and as the mandrel is rotated, as when the operator presses part way the finger pull lever or trigger 59, the clinch nut is drawn onto the mandrel until engagement of nut flange portion 57 is had with nose piece 60 of the gun A. The engagement of the nut with mandrel can be made either when in or out of hole 54. If the clinch nut is first applied to the gun, then it may be inserted in hole 54 by the use of the gun. To fix the clinch nut within the hole 54 of the structure C, the trigger 59 is pulled the remainder of the way while the nose piece is pressed toward the work sheet on the outer side of the hole to thereby effect a pull of the mandrel, the nose piece thereby moving down on the mandrel. A bulbous formation is thereupon formed at 61, Fig. 3, and the clinch nut will be fixed on the top of the structure against axial displacement therefrom and against rotation thereupon. Accordingly, there is provided a threaded opening into which the screw 51 can be extended to fix the plate 52 and the rubber sleeve 53 to the airfoil structure C.

The pull gun A is automatic in operation and by pulling upon the finger trigger 59, all operations necessary to enter the threaded mandrel 58 into the clinch nut, the upsetting action, and the withdrawal of the mandrel 58, are automatically effected in a manner to be described more in detail hereinafter.

The pull gun A is made up generally of three castings of light weight metal, Figs. 1, 4A and 4B, which may be identified as an air cylinder casting 63, a closure plate 64 for the front end of the casting 63, a front or handle casting 65 from which extends air motor and reduction gear housing 66 and the threaded operating mandel 58. The trigger 59 is pivoted as indicated at 67 on the bottom of the front or handle casting 65.

Referring now particularly to Figs. 4B, 5 and 11, the air cylinder casting 63 has a closed end 68 and an air chamber 69 which is open at its front end and closed by the closure plate 64 and in which is worked a piston structure 71.

This piston structure 71 comprises a plate 72, Fig. 4B, a piston rod and oil pump plunger 73 with a reduced threaded portion 74 to which plate 72 is secured by a nut 75. The plate 72 is thinned to receive flexible cups 77 and 78 arranged in opposing fashion respectively on opposite sides of the plate 72 and made secure thereto by retaining plates 79 and 80 which are fixed to the plate 72 by rivets 82 circumferentially spaced thereabout.

Air under pressure is led into the air cylinder casting 63 through a fitting 83, Figs. 5 and 11, in a threaded opening 84 in the closed end 68 of the air cylinder casting 63 and at the bottom thereof. This fitting 83 has a small circular screen 85 fixed to its inner end for removing any large particles of foreign matter which may be delivered with the air to the fitting, Fig. 5. This air enters a chamber 87 wherein there is located an oiler device indicated generally at 88. This oiler device comprises a hollow perforated stem 89 having an enlarged circular flanged head 91 at the air inlet end of the chamber over which is extended the outer end of a cylindrical screen 92. This screen at one end extends to the inlet end of the chamber about the end of the fitting 83 therein while other end of the cylindrical screen 92 is supported upon a shoulder 93 in an enlarged end 95 on the stem 89 and within the cylindrical screen sleeve and along the perforated stem 89 is a felt sleeve 94 adapted to absorb and contain oil. The oiler is supported at the opposite end of the chamber by its enlarged end 95 which snugly fits to the chamber wall to support the oiler device 88 within the chamber 87 so as to leave a concentric space about the oiler device. The enlarged end 95 has an annular recess with a rubber grommet 97 therein to have fluid tight engagement with the chamber wall 87.

On the closure plate 64 is an oiler fitting 98, Fig. 5, through which oil can be delivered to the stem 89. This oil will seep through holes 99 of the stem 89 to keep the felt sleeve 94 soaked with oil. Accordingly, such air that passes the small fitting screen 85 will be passed about the oiler device and oil will be delivered with the air into the pull gun to lubricate the working parts thereof. Fine dust particles which may pass screen 85 will be collected in the oil saturated felt sleeve 94.

In the air cylinder casting 63 and extending parallel to the chamber 87 is a small elongated hole 101, in which is worked a valve operating member or slide 102, Fig. 4B. This valve operating member 102 is connected externally of the casting 63 with a small operating rod 103 which is connected to the pull lever or trigger 59, as indicated at 104, Fig. 4A. The closure plate 64 has a hole 105, Fig. 4B, aligned with the hole 101 of the casting 63 through which the operating member 102 and the small operating rod 103 can slide.

In the front or handle casting 65 and along the bottom thereof, is a longitudinally extending slot 107, Figs. 4A and 4b, adapted to accommodate the small operating rod 103 and to provide portions on the opposite sides thereof for protecting and guiding the same. This slot 107 continues through an enlarged trigger guard or depending portion 108 located immediately behind the trigger 59 to protect the trigger, Fig. 4A. The hole 101 merely serves to guide the valve operating member 102. Fluid is never present within this hole 101.

Extending respectively from the opposite ends of air cylinder casting 63 and parallel to and in a generally horizontal plane with the chamber 87 and above the hole 101, are axially aligned openings 109 and 111, Figs. 4B, 11 and 13, separated from each other by a partition wall 110. These openings do not communicate with one another but are respectively connected through ports 112 and 113, Fig. 4B, with the chamber 87 to receive air therefrom.

Within the opening 109 there is disposed a bronze bushing 114 in which slides a forward motor control valve element 115, Figs. 4B and 11 which controls a rotary motor which drives mandrel 58 in a manner to be described. The valve element 115 has a seat portion 116 adapted to seat with the end of the bushing 114 to seal off the passage within the bushing. The valve element 115 is biased against the bushing seat by a pressure spring 117 which reacts against the inner face of closure plate 64, Fig. 4B. A hole 114' in the bushing 114 is aligned with passage 141 hereinafter mentioned, Fig. 11. The valve element 115 projects from the inner end of the bushing 114 for engagement with a flat face 118 of a stud pin 119 which is adjustably fixed upon the operating member 102 by a set screw 121, Fig. 4B. This pin 119 extends upwardly into an opening 122 to effect the engagement with the valve element 115. The opening 122 extends upwardly from the bottom face of the casting 63, Fig. 13.

The outer end of the opening 111 is threaded at 111' to receive a valve assembly 124 having a valve element 125 slidable therein, Figs. 4B, 11 and 13. This valve element 125 has a seat portion 126 thereon adapted to seat upon a threaded bushing 127, Fig. 4B. The bushing 127 has a reduced portion 128 providing an annular groove 129 through which air is directed after having passed the seat portion 126 of the valve element 125. Air leaves the interior of the bushing 127 from about the valve element 125 and passes outwardly through radial ports 132 to the annular passage 129 about the bushing 127. A rubber gasket 133 seals the bushing 127 to the wall of the opening 111. The valve element 125 is normally retained on its seat by a pressure spring 134. It is moved off its seat by a stud pin 136 fixed to the outer end of the operating member 102 by a set screw 137, Fig. 4B. The projection 136 can be adjusted over a flat surface 138 on the member 102. The projection 136 has a flat face 139 on its upper end for engagement with the end of the valve element 125. The pins 119 and 136 are so arranged on the operating member 102 that the pin 119 will first open its valve 115 before the pin 136 opens its valve element 125. The casting 63 is provided with a slot 140, Figs. 4B and 5, at its bottom through which the pin projection 136 may move.

The trigger assembly comprises not only the trigger 59, but the trigger rod 103, valve operating member 102 and stud pins 119 and 136. As the trigger 59 is pulled part way through a distance equal to the space between the end of the valve 125 and flat face 139 of the stud pin 136, Fig. 4B, the stud pin 136 will then contact end of valve 125 and will be caused to stop momentarily, due to the relatively stiffer spring 134 used on valve 125 than spring 117 on valve 115 which definitely positions the trigger assembly for the first stage of operation, that of threading the pulling mandrel 58 into the clinch nut in a manner to be described.

As the trigger 59 is pulled, the projection 119 on the operating rod 102 opens the forward rotary motor valve element 115 whereby to allow air under pressure of approximately 90 lbs. per square inch to pass from passage 112, Fig. 11, to passage 141 to a distributing valve chamber 142. Within the chamber 142 is a bushing or sleeve 144, Figs. 5 and 11, having longitudinally spaced annular grooves 145, 146, 147, 148, 149 and 150, on its exterior surface and each of which having radially inwardly and circumferentially-spaced holes communicating with the interior of the bushing. Within the bushing and longitudinally slidable therein, are an air reversing valve 153 for the rotary mandrel motor and a pump control distributing valve 154 for the operated hydraulic pump. With the air motor reversing valve 153 in the position shown in Fig. 26B, air under pressure passes groove 145, radial holes 145' thereof and enters the bushing and an annular space 156 provided by a reduced portion of the valve 153 and leaves the chamber 142 through radial holes 146' and the groove 146 and passage 157, Fig. 12. From the passage 157, Figs. 12 and 15, the air under pressure is delivered to an opening 158 in the casting 63 which leads to the closure plate 64. Upon reaching the closure plate 64, the air enters hole 159, Figs. 14 and 15. Extending through the closure plate 64 and at right angles to the hole 159 is a passage 161 which leads to an outlet hole 162 on the forward face of the closure plate 64. Within the forward casting 65 there is a longitudinally extending hole 163 which is aligned with the hole 162 to deliver the air under pressure forwardly through the front or handle casting 65. The passage 163 extends through the casting 65 to air motor in hydraulic piston work chamber 165, Figs. 20, 22 and 23. The passage 163 continues straight through the casting 65 until close to the chamber 165 and at that point angle turns are made in the passage to provide space in the casting for other parts of the gun, Fig. 22.

Within the chamber 165 on the forward end of the front casting 65, Fig. 4A, there is secured a depending cylindrical mandrel support or sleeve 171. The sleeve is threaded to the forward casting 65 as indicated at 172. This sleeve 171 is fixed against axial displacement and projects downwardly to a considerable distance from the open bottom of the chamber 165. The open bottom end of the sleeve 171 has a reduced externally threaded portion 173 on which a threaded cup 174 is fixed. This cup has a central bottom hole 176 downwardly through which extends the screw mandrel 58. The screw mandrel has an enlargement 177 for supporting the same in the bottom of the threaded cup 174. The screw mandrel 58 accordingly rotates in the opening 176 and has an upwardly extending squared shank portion 178.

In the bottom of the cup-shaped member 174, Figs. 4A and 25, at circumferentially-spaced distances, 90 degrees apart and slidable through holes in the bottom of the cup-shaped member 174, are spring supported screw pins 180 for attachment of a nose piece supporting member 181 which is moved downwardly under pressure to effect the upsetting action of the clinch nut, Fig. 24. Nose piece 60 is adjustable in the supporting member 181 and is secured in its adjusted position by a set screw 183. The nose piece 60 has a face 184 which will move down over the mandrel to engage the flange 57, Fig. 2, of the clinch nut B to retain the flange flush with the metal surface while a pulling action is effected by the mandrel 58 to upset the threaded sleeve portion 55 of the clinch nut in a manner to be described. About the pins 180 are return springs 186 engaging with a flange or shoulder 187 on each of the pins whereby to return the pins and the cup-shaped member 181 with the nose piece to the raised position as the hydraulic pressure is released after the upsetting action by means hereinafter set forth.

Projecting upwardly from the cup-shaped member 174 and spaced respectively between the pins 180 are press pins 188 on which is rested a pressure ring 189, Figs. 4A and 25. The ring 189 surrounds a reduced end 191 of a ball bearing retainer 192, Fig. 7, having a ball bearing unit 193 for supporting a driving sleeve 194 having a squared interior for receiving the squared shank portion 178 of the screw mandrel 58 whereby to provide a releasable driving connection therebetween.

The bearing retainer 192 has a threaded portion 196, Fig. 7, which is threaded with the lower end of a hydraulic work piston 197 as indicated at 198, Fig. 4A. The hydraulic work piston 197 is slidable in the mandrel supporting sleeve 171, Fig. 4A, and pin 199 threaded into piston 197 and operable in slot 201 of sleeve 171, prevents rotational movement of the piston within the work cylinder chamber 165.

The upper end of the piston 197 has an enlarged head portion 202, Figs. 4A and 24, engageable with the chamber wall 165 and slidable therein. Between the enlarged head portion 202 and the upper end of the sleeve 171 is a large return spring 203 which will lift the piston to the raised position as the hydraulic pressure is released from chamber 165. Within the head portion 202 of the piston 197 is a groove 204 for receiving piston rings 205, 205' and 206.

The driving sleeve 194, Figs. 7 and 9, is driven from its upper end by an extension through its flange 207 of pins 208 having planet gears 209. The planet gears 209 engage with a sun pinion formation 211 on a driving shaft 212 of a rotary air motor indicated generally at 213. Surrounding the gears 209 and tight fitted in piston 197 is an internal gear 214 which supports ball bearing unit 215 in its upper end and has inwardly extending gear teeth 216 meshing with the planet gears 209. The upper ends of planet gear pins 208 are secured to a bottom flange of a sleeve 210 surrounding driving shaft 212 and which sleeve is rigidly fastened to the ball bearing unit 215. A gear reduction unit is accordingly provided by this arrangement. Both the air motor 213 and the gear unit lie within the work piston 197 and are moveable therewith.

The air motor 213 comprises a casing 219 and upper and lower head elements 221 and 222 in which are ball bearing units 223 and 224 respectively, Fig. 7. Within the casing 219 is a rotor 226 having radial slots 227, Fig. 10, in which are radially slidable vanes 228 which engage with the inner wall surface of the casing 219, Fig. 10. The rotor is offset within the casing 219 whereby to provide space 229 to be provided with air which will enter and engage the vanes 228 to effect the rotation of the rotor. The air leads from passage 163 in front casting 65 through hole 163', Figs. 10 and 22, in mandrel support sleeve 171 and hole 230 in piston 197 and enters the space 229, Fig. 10, from slots 231 and 239 located at one side of a vertically extending and thickened portion 232 of the casing 219.

As the rotor 226 turns, the air will leave the rotor and pass through slots 233 at the opposite side of the motor casing and then through hole 241 in piston 197 and hole 242 in the mandrel support 171, Figs. 10 and 22, and will finally be extended through a long passage 243 in the casting 65, Fig. 22. This passage 243 is similar to the passage 163 and ends at the rear end of the front casting 65. Air is exhausted from passage 243 to a passage 246, Fig. 14, in the closure plate 64 and extending therethrough to the piston air chamber 69 of the casting 63, Fig. 4B. This exhaust air will tend to cause the piston structure 71 therein to move rearwardly. After the discharge of the exhaust air into the chamber 69, and exhaust air leaves the same through a slot 247 of the closure plate 64, Figs. 14 and 17, and a longitudinally extending passage 248 in the casting 63.

The passage 248 of casting 63, Figs. 11 and 17, leads to the rear end of the valve chamber 142 where exhaust air enters annular groove 150 of the bushing 144 and through its radial holes 150' to the center bushing 144 to exhaust to atmosphere through a screw fitting 251 on the rear end of the bushing 144 and its opening 252, Figs. 11 and 26B.

Passage 141, Fig. 11, crosses longitudinal hole 253 from which air will be forced under pressure into small hole 254 in closure plate 64, Fig. 14. Air upon entering hole 254 passes upwardly through passage 256 where it may leave hole 257 extending through the forward face of the plate 64 for delivery through a small passage 261 in casting 65, to oil valve chamber 258 and enters the top thereof as indicated at 259, Fig. 19. The beginning of the passage 261 through the casting 65 is shown in Fig. 21, which matches with closure plate hole 257, Fig. 14. Accordingly, air is delivered to pilot valve fitting 262 in chamber 258, Figs. 4A and 26A. An annular passage 263 fills with air and it is conducted downwardly through a passage 264 to the valve opening 266 about pilot valve element 267.

When front trip valve 268, Figs. 6 and 26B, is engaged by the piston structure 71 within chamber 69, air can be conducted from passage 256 by way of an extension 256', Fig. 14, through trip valve fitting 269 positioned in closure plate 64 within hole 271 thereof, Figs. 6 and 14, and the air will pass outwardly thereof through an exit passage 272 and an exit hole 273, Fig. 26-B. From this hole 273 the air enters hole 274, Figs. 12 and 26B, of casting 63 and continues through a passage 276 and a branch 276' thereof to closed end 68 of casting 63 and inwardly thereof to exhaust valve fitting 277, Figs. 4-B and 26-B, having a valve element 278 adapted to be engaged by the threaded end portion 74 of piston rod or plunger 73, Fig. 4B. When this valve 278, is forced open, the exhaust air leaves through a fitting 279 in the closed end 68 in which is a spring retaining cup 281 and lock ring 280 for retaining a spring 282 adapted to act upon the valve 278. The passage 276 continues to the distributing valve for communication with openings 283 in the bushing 144, Figs. 5 and 26B. This delivers air to a point between the valves 153 and 154 within the bushing 144, Fig. 26B, whereby to separate these valves against the action of spring 347.

Upon further pull of the trigger 59 and over the remainder of its path of movement, the operating member 102 will cause the projection 136 to operate the valve 125 to cause air to be passed directly to the rear of the air cylinder 69 to drive the piston structure 71 forward on its power stroke, Figs. 4B and 26B. Several strokes of the piston are required to complete the upsetting of the clinch nut in order for the bulbous formation 61 to have adequate engagement with the bottom face of the airfoil top sheet, Fig. 3. Air from which has entered the opening 111 from the passage 113, Figs. 11 and 26B, will be passed through a passage 284 to the distributing valve chamber 142 and will enter the annular groove 149 and radial holes 149' of the bushing 144 within the chamber and will pass about the distributing valve 154 to radial holes 148' and annular groove 148 and thence outwardly through passage 286, Fig. 26B, to air cylinder 69 whereby to cause the forward movement of the piston structure 71 therewithin. As the piston starts forward, the rear exhaust valve 278 closes.

The piston rod or oil pump plunger 73 will cause oil in chamber 287, Figs. 1-A and 4-B, to be forced forwardly under pressure through passage 287' and past outlet valve 288, Figs. 4A and 26A. The rod or plunger 73 is slidable through a packing unit 289, Fig. 4B, within an air opening 290 of closure plate 64 from which extends a vent hole 291 to atmosphere, Figs. 4B and 14, and which receives an enlargement 292 of a bushing 293 which is tightly fitted within the rear end of the chamber 287 and provides a bearing surface through which the plunger 73 slides, Fig. 4B. This enlargement 292 has a sealing ring 294 to prevent the rearward passage of oil from the bushing along the plunger 73. After the plunger 73 has completed its stroke, the outlet valve 288 will close to retain the oil under pressure within the chamber 165 on the forward end of the casting 65. The valve 288, Fig. 4A, is forced onto seat 288' by a spring 296 which rests in a screw fitting 297 extended into the valve opening 298 extending upwardly from bottom of the casting. Oil leaves the valve opening 298 and is delivered through a hole 299 to annular groove 301 within oil valve chamber 258.

As the piston 73 continues to reciprocate, the high pressure oil passes annular groove 301 and passage 302 which leads to the upper end of the work cylinder chamber 165, and forces the work piston 197 downwardly to bring work face 184 of nose piece 60 onto the flange 57 of the clinch nut B to upset the clinch nut and form the bulb 61 thereon. The parts will be extended as shown in Fig. 24. Several fast strokes of the plunger 73 will have been taken to complete the upsetting of the clinch nut. The distributing valve 154 will have reciprocated to effect the power and return strokes of the air piston 71. An oil pressure of approximately 4000 lbs. per square inch will be obtained when air at a pressure of 90 lbs. per square inch is used.

Within the oil valve chamber 258, Fig. 4A, is an oil shut-off valve sleeve 303 which is supported in a raised position by a spring 304 surrounding a piston shank 305 upon the upper end of which is an enlargement 307 adapted to support pilot air valve 267, Fig. 4A. As long as the valve sleeve 303 is raised, oil can be passed through groove 301 to the work cylinder 165. The enlargement 307 is slidable in a bushing 308 having a bottom with an opening through which the shank enlargement 307 passes. The valve sleeve 303 is forced down by the enlargement 307 to release the oil from chamber 165 in the following manner.

The lower end of the shank 305 is flattened on one side at 309 to receive a slotted trip member 311 which is pivoted at 67 on the same pin on which trigger 59 is pivoted, said pin being secured in depending lugs 313, Fig. 4A. The lower end of shank 305 is threaded to receive adjusting nuts 314 and 316. The slotted trip member 311 extends into an elongated slot 317 of mandrel support sleeve 171 and into an opening 318 of hydraulic piston 197. The piston 197 will force the slotted member 311 down through the slot 317 for engagement of its bottom edge with adjustable nut 314 whereby to force the shank 305 and the valve sleeve 303 downward so as to cut off the supply of oil to the hydraulic work cylinder 165. This will stop the action of the work piston 197 and the upsetting action upon the clinch nut. By adjusting the nuts 314 and 315, the size and shape of the bulbous formation of the clinch nut can be controlled.

When trip member 311 engages adjusting nut 314, it lowers shank 305 a small fraction of an inch and allows air to flow from passage 264 upon piston 307 and valve 267 to instantly carry said pilot valve 267 to its lowest point. The work piston 197 travels downwardly very slowly. Once pilot valve 267 has permitted air to be distributed over piston 307, the piston 307 and shank 305 will be forced down quickly to operate valve sleeve 303 free of the trip member 311.

As the valve sleeve 303 descends, holes 303' will feed oil to the interior of the sleeve 303. From here oil is returned through the bottom of the sleeve by way of passage 336 to oil reservoir or pressure regulator 319 in the rear end of casting 65, Figs. 4A and 4B.

The oil reservoir or pressure regulator 319 has a rubber sack or diaphragm 321 and a perforated metal baffle 322 to keep the rubber diaphragm from closing the oil outlet 323, Fig. 4A. In order to insure a full flow of oil to the hydraulic cylinder 287 during the return stroke of oil plunger 73, it is necessary to maintain pressure of air on the diaphragm during the return stroke of said oil plunger. This arrangement permits the gun to be held at different angles when in operation and maintains oil at a pressure within the oil passages. The air pressure which is held against the diaphragm 321 during the return stroke of the pump plunger 73 is slightly higher than the pressure during the power stroke, because of air inlet and outlet metering orifices or holes 338 and 339, Figs. 4B and 14, in retaining members 381 and 382, and the outlet hole 339 being smaller than inlet hole 338 so that the air leaves the rubber sack slower than it is added. The diaphragm within the pressure regulator or oil reservoir 319 is fixed therein or anchored at its forward end by a member 381, Fig. 4B, and a retaining member 382 having a hole 383 aligned with hole 384 of the retaining member 381. A fastening screw 385 is extended between the members 381 and 382 and when tightened will spread the end of the diaphragm against the wall of the reservoir and will compress a rubber sealing ring 386 between the members and sealing washer 387.

Oil leaves the reservoir 319 through hole 323, Fig. 4A, and will pass to screw fitting 324 within hole 326 leading to the passage extension 287' of the oil pump chamber 287, Fig. 4A. Within the screw fitting 324 is an oil inlet check valve 327 which can be raised from its seat against the action of a spring 329 surrounding a guide pin 331 extending down into the hole 326. Accordingly, a constantly increasing pressure is built up in the top of the work cylinder 165 to effect the operation of the tool. Oil in cylinder 165 is returned to the reservoir 319 when relief valve sleeve 303 has been lowered by the work cylinder 197 acting through slotted member 311 and under the action of piston return spring 203. This oil is returned to the reservoir 319 by way of passage 302, groove 303', chamber 258 and passage 336 extending between the oil valve chamber 258 and the reservoir 319, Figs. 4A and 18.

Leakage oil from bushing 293, Figs. 4B and 18, can enter a longitudinally extending passage 333 from a hole 334 which can pass to the reservoir 319 through a hole 335, Fig. 4A.

Within opening 271 of the closure plate 64, Figs. 6 and 14, is the front trip valve fitting 269, to which air passes under pressure from the passage 256 for distribution to passage 276 in closure plate 64, Fig. 26B, and to a small hole 272 and passage 337 for delivery to hole 338' in the front face of the closure plate whereby to charge the reservoir chamber 319 with air and to expand the diaphragm 321 therein to cause the oil within the reservoir to be placed under pressure. The hole 338 is of small dimension and meters the air passing into the reservoir chamber 319. This reservoir chamber is also provided with a vent hole 339' in the closure plate 64 which leads to the atmosphere. The small holes 338 and 339 will maintain the proper air supply in the chamber 319 for the correct low pressure of the oil in the reservoir and at the opposite side of the diaphragm 321 for the return stroke of the pump plunger 73, but the pressure is reduced to some extent during the next cycle of operation of the piston 71, Fig. 1A, because of passage 337 being opened to exhaust at the end of return stroke and as a result of continued leakage through vent holes 339 and 339'.

The front trip valve fitting 269, Figs. 6 and 26B, is tightly fitted within the hole 271. The inlet passage 256 leads to the same so as to supply pressure to the forward end of the valve element 268 and the outlet passages 272 and 337 lead off from behind the valve seat. A spring 341 surrounds an extension 342 of the valve element 268 and is confined within a threaded cup 343 in fitting 269. When the valve element 268 is engaged by the piston structure 71, the valve element 26 is opened against the action of spring 341. Air is delivered to opening 345 in the fitting 269 and upon the valve element 268 being lifted from its seat, the air passes through the fitting 269. An annular groove 346 in the fitting receives the air from the hole 345 and will distribute air to the passages 272 and 337, Figs. 14 and 26-B, entering the opening 271 in which the valve fitting 269 is disposed.

When piston structure 71 engages the front trip valve 268, Figs. 6, 14 and 26B, live air from hole 256' is allowed to flow through the hole 345, passage 337 and its branch 337', Fig. 4-B, to the reservoir chamber 321 and to passage 274 to the distributing valve bushing 144 whereby to shift valve structure 154 in the air distributing chamber 142 rearwardly against the action of spring 347, Fig. 5, which reverses the flow of live air and exhaust to the opposite end of air cylinder 69 and causes the return of the piston structure 71.

As piston structure 71 starts its return stroke, the front trip valve 268 will be closed whereby to trap live air in the passage 276 so as to continue to maintain the valve structure 154 in the valve bushing 144 separated from the valve structure 153 therein. Pressure is maintained at 283, Figs. 5 and 26B, and by small feeder port 348 Fig. 26B in the bushing 144 and passage 349 leading from annular groove 145 of the distributing valve bushing 144 which receives air under pressure from the passage 141 leading from the forward motor valve 115. This valve structure 154 is so held until piston structure 71 contacts and opens rear trip valve 278 which exhausts live air from space 351, Fig. 28, within the distributing valve bushing by way of passage 276 and allows valve structure 154 to be extended again toward the valve structure 153. At the end of the power stroke, the check valve 288, Figs. 4A and 26A, of the oil passage will have closed and at the beginning of the return stroke of the air piston 71 the oil inlet check valve 327 closes by the suction of the plunger 73 and by the pressure of oil in the reservoir 319.

In its rearward movement, the valve 154 shuts off the supply of live air from the open valve 125 to the rear end of the air chamber 69, since an intermediate collar 154a on valve 154 prevents air from passing from groove 149 to groove 148. In addition, an annular recess 154b, Figs. 5 and 26B, between the forward end of valve 154 and the intermediate collar 154a will be aligned with passage 286 which leads to the rear end of air chamber 69, and the air from the air chamber 69 is thus vented by the passage 286, groove 148 of the bushing 144, and annular recess 154b and radial holes 154c and axial hole 154d of valve 154 to atmosphere through hole 252 in fitting 251 at the rear end of bushing 144, Fig. 28. The live air passing the valve 125, as the valve 154 is moved to its rearward position, is simultaneously diverted by the grooves 149 and 150 in the sleeve into passage 248, Figs. 26B, 28, thus reversing the direction of flow of the air therein. Some of this air passes from passage 248 through passage 246 to the forward end of the air chamber 69 to force piston 71 back on a return stroke and some air passes from passage 248 through passage 243 to the air motor 213 which is thus now subjected to air under pressure on both sides of the motor so that it cannot rotate and thereby the mandrel is locked against rotation preparatory to further thrusts of the work piston to upset the clinch nut.

When the piston 71 opens the rear trip valve 278, air pressure is exhausted from passage 337 and passage 276 permitting the distributing valve 154 to return to its first position and to reverse the flow of live air and exhaust to opposite ends of the cylinder 69 and to start the next power stroke of the pump. Successive reciprocating movements of the valve 154 and the pump plunger 73 will be made.

On the last power stroke of the piston structure 71 and after sufficient oil has been pumped into work cylinder 165 to complete the upsetting of the clinch nut against the lower face of the work sheet, pressure relief valve trip member 311 contacts adjusting nut 314 on the lower end of relief valve shank 305 and pilot air relief valve 267 will start downwardly to allow live air to pass from the inlet 264, Fig. 4A, to outlet 353 and passage 354 rearwardly to closure plate hole 356 for delivery through passage 357 to hole 358, Figs. 14, 16, for delivery to the forward end of distributing valve bushing 144 whereby to cause rearward movement of the air motor reversing valve structure 153 therein to reverse the flow of air and exhaust within the passages 163 and 243 leading to the air motor so as to reverse the direction of rotation of the motor and to screw the mandrel from the upset clinch nut. This is brought about by live air passing valve 115, Figs. 4B, 26B and 30, being trapped in front of valve 153 and by passage 163 being open to exhaust by way of valve groove 146, radial holes 146', valve recess 156, radial holes 147', valve groove 147 and an exhaust post 142' in casting 63 leading from valve chamber 142. The air motor reversing valve 153 has accordingly been actuated. The distributing valve 154 is moved at the same time which will reverse the flow of live air and exhaust air in the opposite ends of the cylinder 69 and to the passage 243 leading to the air motor. The piston 71 will have travelled part of its power stroke, the air pressure relief valve 267 will have been operated, the air motor reverse valve 153 and the distributing valve 154 will have shifted, the oil outlet valve 288 will have closed and the plunger 73 will have stopped its forward travel. Air will then pass to the forward end of the cylinder 69 and return the piston 71 and will pass through passage 243 to the opposite side of rotary air motor to screw the threaded mandrel 58 from the clinch nut while air is exhausted from the forward side of the rotary air motor through passage 163, distributing valve chamber 142 and exhaust outlet 142', Figs. 5 and 26B, of the casting 63. A reverse rotation of the air motor is accordingly effected.

When the trigger 59 is released all movable parts will be returned to their initial positions except the oil inlet valve 327 which will close thereafter as air is exhausted from the oil reservoir 321. However, live air still remains in the front of the chamber 69 and until the trigger 59 is released. This release of the trigger cuts off the live air supply and allows the pressure pilot valve 267 assembly to close. Exhaust air escapes from a hole 361, Fig. 26B, to atmosphere, thus venting passage 141 so that valves 153, 154, can return to their initial positions, whereupon air from the front of chamber 69 escapes to atmosphere by way of passage 248 and hole 252 of valve bushing 144.

The hydraulic mechanism H is filled with oil through a fitting 388, Fig. 1, fixed in a threaded opening 389, Fig. 19, and oil is delivered through a passage 391 in the relief valve chamber 258.

In the top of the front casting is a plug 392, Fig. 1, which can be loosened for the purpose of venting any air which might be trapped in oil system. This plug fits in a threaded opening 393, Fig. 18. In a threaded opening 396, Fig. 4A, in the head of the work piston is a plug 396' which can be removed in order to insert a steel rod to press the vane motor 213 out of the work piston for inspection or repairs.

The following text is a statement of the operation of the tool with particular reference to the diagrammatic views of Figs. 1A, 26A, 26B and 29 to 31 inclusive. Where more detailed understanding of the operation is desired, the preceding paragraphs should be referred to.

In Figs. 1A, 26A and 26B, the positions of the parts at the first stages of the cycle of operation are shown. The trigger 59 has been pulled part way thus moving trigger rod 103 and valve operating rod 102. Stud pin 119, fixed to the rod 102, engages rotary-air-motor control valve 115 and lifts it off its seat against the action of spring 117, Fig. 4B. Further movement of the trigger 54 and the valve operating rod 102 is resisted by the engagement of stud pin 136 with the air piston control valve 125 and the spring 134 thereof that is stronger than the spring 117 of valve 115.

*Over-all statement of operation*

When the valve 115 is opened, live air is passed through passages marked with solid arrows, Figs. 26A and 26B. This air is supplied from the air cleaning chamber 87, Figs. 5 and 11 and 1A, and after passing cleaner sleeve 94 passes port 112, valve 115, passage 141, valve chamber 142, sleeve groove 145, port 145', rotary air motor distributing valve 153, port 146', sleeve groove 146, passages 157, 158, Figs. 12 and 15, and 163 leading to the air motor 213, Figs. 10 and 22, whereby the screw mandrel will be rotated by the motor to place the clinch nut B on the tool.

Exhaust air from the air motor 213, indicated by dotted single arrows from the rotary air motor 213 will pass rearwardly through passages 243, 246, Fig. 14, into cylinder 69, out of cylinder 69 by way of passage 247, and 248, Figs. 14 and 17, sleeve groove 150, Figs. 11 and 26B, radial holes 150', center of valve sleeve bushing 144, opening 252 in fitting 251 on the bushing and be exhausted to the atmosphere therefrom. The rotary air motor will accordingly be driven as long as the operator keeps the trigger pulled to or beyond active position and until the flange 57 of the clinch nut is pulled against the face 184 of the nose piece 60, Figs. 1A and 24, whereupon the air motor will become stalled.

The clinch nut can be threaded on the mandrel as thus explained, either while it is removed from the work piece or when located in the work piece. If it is threaded first on the mandrel before being placed in the hole in the work piece the tool can be used to insert the clinch nut into the hole.

While air is being passed to the air motor to drive the same, air at the same time branches away from passage 141 and is passed as shown by the solid arrows through 253, Figs. 11, 14 and 26-B, into hole 254, up through passage 256, out of hole 257 and into passage 261 leading to pilot air valve 267 located in relief valve chamber 258 where said pilot valve stops further flow of the air for the present time.

Oil will at this time normally lie within the hydraulic mechanism under pressure maintained by the oil reservoir diaphragm 321 and in the direction of the double headed dotted line arrows shown in Fig. 26A. The inlet and outlet oil valves 327 and 288, Fig. 4A, will be closed at this time. The oil pump cylinder 287 and the passages leading therefrom to the work cylinder will be filled with oil and the hydraulic mechanism will at this time accordingly be at rest.

Referring now to Figs. 26–B and 27, there is shown a direction of flow of air and oil within the tool and the positions of the parts, at the beginning of the first power stroke of the piston 71 in the air cylinder 69. The same kind of arrows as in the above matter are used, and they carry the same indications. The clinch nut will have been secured to the mandrel as above described and now the trigger 59 will be pulled by the operator the remainder of the way overcoming the spring 134 and opening the air cylinder control valve 125, Fig. 4B. Air will accordingly flow, Fig. 11, from the port 113 past valve 125, passage 284, valve chamber 142, groove 149, through holes 149', past valve 154, through holes 148', into groove 148 and passage 286 and to air cylinder 69 to start the forward movement of the piston 71. Oil plunger 73 will accordingly put the oil in the oil pump cylinder 287 and the extension 287' under high pressure, and will force oil past oil outlet valve 288, Figs. 4A and 1A, through passages 299 and 301 and past oil cut-off valve 303 and into oil passage 302 leading to the top of work cylinder 165 to act upon work piston 197 to start the upsetting operation of the clinch nuts and the depressing of the nose piece 60 against the flange of the clinch nut, assuming, for the purposes of description, that the threaded mandrel 58, Fig. 24, remains stationary while it supplies the reactive force. The path of movement of the oil being forced to the work piston is shown by the full double headed arrows in Fig. 27. The direction of pressure of oil underneath inlet valve 327 is indicated with the double headed dotted line arrow and will be under reduced pressure as provided by the oil reservoir regulator 319.

Air from the front of the cylinder 69 will exhaust through passage 247, Figs. 14 and 26B, and and will join with passage 248 to exhaust to the atmosphere through the opening 252 in the manner as indicated by the single headed dotted line arrows. At this stage both control valves 115 and 125 are in their open positions, Figs. 5, 11, 26-B and 27, and air is passing to the rotary air motor 213 to maintain said motor in its stalled condition, as well as to the rear end of the cylinder 69. The exhaust valve element 278 in the rear end of the cylinder 69 becomes closed at the start of the power stroke of the piston 71.

Referring now to Fig. 28, there is shown the position of the parts, and the direction of the pressure of the air and oil with regard thereto, at the end of the first power stroke after trip valve 268 at the front of cylinder 69 has been tripped by the piston 71 and at the beginning of the piston return stroke. With the cylinder trip valve 268 opened, trigger 59 having been maintained in its fully pulled position, air already provided in the passage 261, in the manner above indicated, is diverted through passage 256 past valve 268, passages 272, 276 and 283 is directed to space 351 in valve sleeve bushing 144 to separate the air cylinder distributing valve 154 from valve 153 valve 154 to its rearward position and holding it there momentarily, that is until the valve 154 is thereafter sustained in this rearward position for the period of the return stroke of the air piston 71 against the pressure of spring 347, despite air from passage 276 being cut off upon retreat from valve 268, by air under pressure from passage 349 leading from the bushing groove 145 that is supplied by air from passage 141, to bushing opening 348, Fig. 26B. Air in the rearward part of the cylinder 69 is, upon said return of piston 71, now exhausted through passage 286, valve chamber 142, groove 148, holes 148', hole 154c leading to the hollow center 154d of valve 154 and through said center 154d and through exhaust opening 252 to the atmosphere.

At the time the trip valve 268 is thus opened air is added through passage 337 to the oil reservoir regulator 319. This is for but a short time as the piston 71 releases the trip valve 268 soon to begin its return stroke but the time is sufficient to keep the reservoir diaphragm 321 provided with air and put it under added pressure to keep the oil under pressure in the oil system. (Compare Figs. 1A and 4A.) This is accomplished by the oil in the reservoir 319 being pushed up past inlet valve 327 to oil chamber 287 during the return stroke of piston 71.

Since the valve 154 has been moved to the rear end of the bushing 144 and is sustained therein while the return stroke of the piston 71 is taking place by air in the space 351 in said bushing, air can now flow from passage 284 through the air distributing chamber 142 and past valve 154, passages 248 and 247 to the front side of the piston 71 to move it rearwardly on its return stroke. Movement of valve 154 rearwardly cuts passage 248 off from exit 252 and at the same time live air leaves cylinder 69 and passes through passages 246 and 243, Figs. 10 and 22, to the mandrel motor to balance the same against the force of air leading into the motor through passage 163 whereby the mandrel air motor will be held against rotation on the return stroke of the oil pump plunger.

Upon piston 71 reaching the end of its return stroke, it unseats the valve 278, Figs. 4-B and 26-B, whereupon air in entering space 351 from passage 349 escapes by way of passages 283, 276, 276' through exhaust cup 281 to the atmosphere. This permits spring 347 in bushing 144 to return the valve 154 to the position permitting air to pass, as for the first power stroke, through passage 286 to the rear of the piston 271 to start the second power stroke. Successive movements of the piston 71 finally place the work chamber 165 under full oil pressure, thereby fully upsetting the clinch nut.

Referring now particularly to Fig. 29, illustration is made of the positions of the parts as the piston is started on its last power stroke. As shown in Fig. 29, the oil cut off valve 303 in the relief chamber 258 will have been pulled down by the wall of opening 318 of work piston 197 having pulled down the slotted trip member 311 which upon engaging the nut 314 of the shank 305, Fig. 4-A, pulls down the cut off valve 303 to permit the air pilot relief valve 267 and piston 307 and valve sleeve 303 to be forced downwardly to their lowermost positions by the air under pressure traversing passage 261. Air will, as a result, flow from the passage 261, past valve 267, up passage 353 and into passage 354 to the forward end of chamber 142 and will cause both valves 153 and 154 to be shifted as a unit against the pressure of spring 347 from the positions shown in Fig. 29 to the positions shown in Fig. 30 due to the fact that the area of the rear end of valve 153 is greater than the effective area of the forward end of the valve 154 by the area of the end of the valve extension 154', Figs. 5 and 26-B, when abutting the rear end of valve 153. Since the oil cut off valve 303 has been dropped in the manner just stated, the spring 203 of the work piston will lift the work piston and return oil from the work chamber 165 down passage 302 into space 301 through hole 303' into the interior of the valve 303 and under the bottom thereof and passage 336 to the reservoir while the work piston 197 is rising. Trip lever 311 will normally thus continue the flow of oil to the top of the work piston before the end of the last power stroke whereupon a further slight continuance of said stroke of the air piston 71 will cause such oil as is thereby pushed along the oil pump cylinder 287 to be returned by way of port 299, or 303' through valve 303, through passage 336 to the oil reservoir 319. Pressure of the distributing valve 153 against distributing valve 154 will prevent valve 154 from again shifting forwardly to start another power stroke.

As shown in Fig. 30, both valves 153 and 154 are shifted rearwardly during the last power stroke, as just stated, and air under pressure was directed to the front of air cylinder 69. When valves 153 and 154 were shifted rearwardly as a unit by entry of air to the forward end of valve 153, the rearward movement of valve 154 opened the rear of chamber 69 to atmosphere by way of passage 286, port 148', hole 154c, center 154d of valve 154 to exhaust port 252. This rearward shift of valve 154 also connected passage 284 to groove 149, to holes 149', around valve 154, hole 150', groove 150, passages 248 and 247 to the front of piston 71 to retain said piston in its rearwardmost position.

At the same time, air is led from the front of cylinder 69 through passages 246 and 243 to the rotary air motor. The rearward movement of the air valve 153 cuts off flow of live air from passage 141, groove 145 and holes 145' to passage 163, Figs. 26-B and 30, to the threading side of the rotary air motor 213, and since live air is now passed through passage 243 at the opposite side of the air motor, the reverse rotation of the rotary air motor 213 and of the mandrel 58 will be effected so that the mandrel is screwed out of the upset clinch nut and the tool is thus disengaged from the work. The valve element 153 has been thus shifted to discharge air from the passage 163, past valve 153 and through exhaust port 142', Fig. 26B, the air having entered valve bushing 144 through groove 146, passing through valve space 156 of valve 153 and outwardly through groove 147 and through exhaust port 142'. This reverse rotation of the rotary air motor continues until the mandrel has been released from the clinch nut and thereafter until trigger 59 is released. The oil will be entirely returned from the top of cylinder 165 to the oil reservoir 319 and urged under this action of the diaphragm 321 to open inlet valve 327 and fill the pump cylinder 287 and its extension 287' with oil to condition the tool for the next upsetting operation.

As the operator removes his finger from the trigger 59 springs 134 and 117, seat valve stems 125 and 115 and the air flow to the tool is thus cut off and the spring 347 returns valves 154 and 153 to their starting positions and the parts of the tool will come to rest and assume the position shown in Fig. 31. Seating of valve 115 cuts off from the passage 261 leading to pilot air relief valve 267 which will thereupon return to its seat and the oil cut off valve 303 will be lifted to its initial position by the spring 304, the inlet and outlet valves 327 and 288 will come to rest upon their seats under pressure of springs 329 and 296 respectively. Upon again pulling the trigger 59 part way a new cycle of operation is started.

The gun is easily and quickly adapted for all different sizes and lengths of clinch nuts by simply adjusting nose piece 60 and the adjusting nuts 314 and 316 on the lower end of the pressure relief valve holding piston 307. When the nose piece is properly adjusted for a given length of clinch nut, the oil pressure relief valve nut 314 is regulated to give the work piston 197 the correct travel with relation to the work cylinder to form the bulb 61 against the underside of the work sheet upon the lever 311 contacting the adjusting nut 314, to trip the pressure relief or cut off valve 303 and drop the piston 307 and air relief valve 303. The several castings 63, 64 and 65 are connected together by fastening screws, Fig. 4B. The closure plate 64 is secured to the forward casting 65 by fastening screws 376, and in turn the closure plate 64 is secured to the forward end of the air cylinder casting 63 by fastening screws 377.

It should now be apparent that there has been provided a pull gun for clinch nuts which by two successive pulls of a trigger in the same direction and in two steps, the threaded mandrel is fixed to the clinch nut upon the first pull of the trigger part of the way and wherein on the pull of the trigger the remainder of the way, the hydraulic mechanism will be operated to effect the operation and movement of the work piston to form the bulb on the clinch nut in order to retain it upon the work sheets and wherein automatically when the piston has traveled far enough to contact the relief valve trip lever to form bulb, relief valve 303 is operated to discontinue the flow of oil to the work piston under pressure and to cause the reversal of the mandrel rotary air motor and the unscrewing of the mandrel from the upset clinch nut. The threaded mandrel will be thus disengaged from the clinch nut.

While various changes may be made in the detail construction, it shall be understood that such changes shall be within the spirit and scope of the present invention as defined by the appended claims.

We claim:

1. A pull gun for pulling clinch nuts comprising a screw mandrel for receiving the clinch nut, a rotary air motor for driving the screw mandrel, a housing having a work chamber for receiving the rotary air motor, a hollow work piston operable in the work chamber and nose means slidably connected to the housing and surrounding the mandrel and movable with the piston, said work piston surrounding the air motor and being axially movable relative to the mandrel and housing to move the nose means relative to the mandrel.

2. A pull gun for pulling clinch nuts as defined in claim 1, and spring means surrounding the work piston and reacting against the work chamber and work piston to urge the return of the work piston to its initial position after the upsetting has been performed.

3. A pull gun for pulling clinch nuts comprising a screw mandrel for receiving the clinch nut, a rotary air motor for driving the screw mandrel, a housing having a work chamber for receiving the rotary air motor, a hollow work piston operable in the work chamber, and nose means slidably movable relative to the housing and surrounding the mandrel, biasing means for normally supporting the nose means in a retracted position relative to the housing, said work piston surrounding the air motor and being axially movable relative to the mandrel and housing, said work piston being engageable with the nose means to project the same relative to said housing on the work stroke of said piston against the action of the biasing means thereof.

4. A pull gun for pulling clinch nuts comprising a screw mandrel for receiving the clinch nut, a rotary air motor for driving the screw mandrel, a housing having a work chamber for receiving the rotary air motor, a hollow work piston operable in the work chamber, nose means slidably connected to the housing and surrounding the mandrel and movable with the piston, said work piston surrounding the air motor and being axially movable relative to the mandrel and housing to move the nose means relative to the mandrel, and a power arrangement within the housing for operating the rotary air motor and the work piston.

5. A pull gun for pulling clinch nuts, as defined in claim 4, and said power arrangement including a hydraulic mechanism removed from the work chamber and having a pump for forcing oil under pressure into the work chamber and a pneumatic mechanism having an air cylinder piston for operating the hydraulic pump, said pneumatic mechanism having a manually-initiated valve control means for controlling the supply and exhaust of air to both the rotary air motor and to the air cylinder.

6. A pull gun for pulling clinch nuts, as defined in claim 5, and said hydraulic mechanism further having a substantially constant pressure oil reservoir including an element operable by the pneumatic mechanism and adapted to maintain the oil within the oil reservoir and the hydraulic mechanism under pressure at all times, said hydraulic mechanism further having oil relief valve means operated by the work piston for stopping the supply of oil to the work cylinder and conditioning the mechanism for a return of the oil to the reservoir, and biasing means associated with the work piston and reacting against the work chamber upon release of the oil pressure to urge the return of the work piston to its initial position and the return of the oil through the relief valve to the oil reservoir.

7. A pull gun for pulling clinch nuts, as defined in claim 5, and said hydraulic mechanism further having a reservoir for receiving the return flow of oil from the work cylinder, relief valve means having a shank portion, an operating member pivoted on the housing and connected with the shank portion of the relief valve means, said operating member being engageable by the work piston to operate the relief valve as the work piston is moved to the end of its stroke, and adjustable means in the connection between the operating member and the shank of the relief valve to adjust the gun to different sizes and lengths of clinch nuts.

8. A pull gun for pulling clinch nuts, as defined in claim 5, and said hydraulic mechanism further including an air operated substantially constant pressure reservoir, a trip valve for the air cylinder having a portion extending into the air cylinder to be engaged by the piston therein and to be operated thereby, a passageway means for delivering air under pressure to the trip valve and from the trip valve to the reservoir on the operation of the air piston in the air cylinder whereby to maintain air pressure within the constant pressure reservoir.

9. A pull gun for pulling clinch nuts, as defined in claim 5, and said hydraulic mechanism having oil relief valve means operable by said work piston to discontinue the flow of oil to the work piston at the end of its work stroke, said pneumatic mechanism further having pilot air valve means operable in response to the operation of the oil relief valve means, said valve control means including an air motor reversing valve operable in response to the pilot air valve means, upon the end of the stroke of the work piston to rotate the air motor in a reverse direction whereby to release the mandrel from the clinch nut.

10. A pull gun for pulling clinch nuts, as defined in claim 5, and said hydraulic mechanism further having oil relief valve means and an oil reservoir, means for operating said relief valve at the end of the stroke of the work piston, said pneumatic mechanism having pilot air valve means operable in response to the operation of the oil relief valve means, an air motor reversing valve operable in response to the operation of the pilot air valve and at the end of the stroke of the work piston to cause the rotation of the air motor in a reverse direction and to release the clinch nut, said valve control means having a distributing valve bushing with openings therein, and a distributing valve operable within the bushing to reverse the flow of air to the opposite sides of the air cylinder at the end of each stroke, trip valve means operable in connection with the distributing valve means and located respectively at the opposite ends of the air cylinder and operated by the piston therein, and said air motor reversing valve operable in the same said distributing valve bushing and in conjunction with said distributing valve.

11. A pull gun for pulling clinch nuts, as defined in claim 5, and said housing comprising three castings separable from one another, one of said castings having therein the working piston and the rotary air motor, said pneumatic mechanism having its air cylinder and piston disposed in a second casting, and the third casting being disposed between the other two castings, and said hydraulic pump having a plunger connected to the air piston and extendable through the third casting from the second casting and into the first casting.

12. A pull gun, as defined in claim 5, and said hydraulic mechanism further having a substantially constant pressure reservoir disposed within the first mentioned casting, a plunger bushing in the first mentioned casting in which the hydraulic pump plunger is operated, and leakage passage means extending from said plunger bushing into said reservoir to receive and return oil which may be passed through said bushing along the pump plunger.

13. A pull gun for pulling clinch nuts, as defined in claim 5, and said valve control means having a control trigger device operable upon a partial pull to effect the operation of the air motor and the rotation of the mandrel and upon a further pull of the trigger to effect the operation of the hydraulic mechanism and the work piston.

14. A pull gun for pulling clinch nuts, as defined in claim 7, and said nose piece means being adjustable in axial dimension whereby to adapt the tool for different lengths of clinch nuts and for different adjustments of the mandrel.

HOWARD R. FISCHER.
JAMES A. ROBERTS.

REFERENCES CITED

The following references are of record in the file of this patent:

UNITED STATES PATENTS

| Number | Name | Date |
| --- | --- | --- |
| 2,344,127 | Cherry | Mar. 14, 1944 |
| 2,403,262 | Colley | July 2, 1946 |
| 2,403,675 | Mitchell | July 9, 1946 |
| 2,437,191 | Gill | Mar. 2, 1948 |